(12) United States Patent
Desousa et al.

(10) Patent No.: US 12,168,703 B2
(45) Date of Patent: Dec. 17, 2024

(54) METHOD FOR MAKING WATER-DISPERSIBLE AND WATER-DISPERSED POLYMERS

(71) Applicant: SWIMC LLC, Cleveland, OH (US)

(72) Inventors: Joseph D. Desousa, Pittsburgh, PA (US); Arthur Riazzi, Harrison City, PA (US); Benjamin J. Webster, Pittsburgh, PA (US); Robert M. O'Brien, Monongahela, PA (US); Kailas B. Sawant, Mars, PA (US); Richard H. Evans, Wexford, PA (US); Sebastien Gibanel, Givry (FR)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/198,098

(22) Filed: May 16, 2023

(65) Prior Publication Data
US 2023/0416417 A1    Dec. 28, 2023

Related U.S. Application Data

(63) Continuation of application No. 16/771,798, filed as application No. PCT/US2018/064981 on Dec. 11, 2018, now Pat. No. 11,673,976.

(60) Provisional application No. 62/597,206, filed on Dec. 11, 2017.

(51) Int. Cl.
C08F 2/28      (2006.01)
C08F 2/22      (2006.01)
C08F 8/44      (2006.01)
C09D 5/02      (2006.01)
C09D 133/12    (2006.01)
C09D 151/00    (2006.01)

(52) U.S. Cl.
CPC ............... C08F 2/28 (2013.01); C08F 2/22 (2013.01); C08F 8/44 (2013.01); C09D 5/022 (2013.01); C09D 133/12 (2013.01); C09D 151/003 (2013.01); C08F 2810/50 (2013.01)

(58) Field of Classification Search
CPC ......... C08F 18/24; C08F 2/20; C08F 218/24; C08F 24/00; C08F 20/28; C08F 8/32; C08F 20/36
See application file for complete search history.

(56) References Cited

U.S. PATENT DOCUMENTS

| 3,943,187 | A |   | 3/1976  | Wu |
| 4,021,396 | A |   | 5/1977  | Wu |
| 4,076,676 | A |   | 1/1978  | Sommerfeld |
| 4,212,781 | A |   | 7/1980  | Evans et al. |
| 4,247,439 | A |   | 1/1981  | Matthews et al. |
| 4,285,847 | A |   | 8/1981  | Ting |
| 4,413,015 | A |   | 11/1983 | Anderson et al. |
| 4,442,246 | A |   | 4/1984  | Brown et al. |
| 4,446,258 | A |   | 5/1984  | Chu et al. |
| 4,476,262 | A |   | 10/1984 | Chu et al. |
| 4,480,058 | A |   | 10/1984 | Ting et al. |
| 4,517,322 | A |   | 5/1985  | Birkmeyer et al. |
| 4,963,602 | A |   | 10/1990 | Patel |
| 5,296,525 | A |   | 3/1994  | Spencer |
| 5,527,840 | A |   | 6/1996  | Chutko et al. |
| 5,645,968 | A | * | 7/1997  | Sacripante ........... G03G 9/0804 523/335 |
| 5,830,952 | A |   | 11/1998 | Pedersen et al. |
| 5,922,817 | A |   | 7/1999  | Pedersen et al. |
| 6,090,891 | A |   | 7/2000  | Frischinger et al. |
| 6,300,428 | B1 |  | 10/2001 | Stevenson et al. |
| 6,784,307 | B2 |  | 8/2004  | Walker |
| 6,989,459 | B2 |  | 1/2006  | Walker |
| 7,189,787 | B2 |  | 3/2007  | O'Brien et al. |
| 7,288,595 | B2 |  | 10/2007 | Swarup et al. |
| 7,592,047 | B2 |  | 9/2009  | O'Brien et al. |
| 8,092,876 | B2 |  | 1/2012  | O'Brien et al. |
| 8,835,012 | B2 |  | 9/2014  | O'Brien et al. |
| 8,853,322 | B2 |  | 10/2014 | Mecfel-Marczewski et al. |

(Continued)

FOREIGN PATENT DOCUMENTS

| CN | 102040703 | 5/2011 |
| CN | 102040704 | 5/2011 |

(Continued)

OTHER PUBLICATIONS

Translation of JP 04-180902 (Year: 1992).*

(Continued)

Primary Examiner — Robert C Boyle
(74) Attorney, Agent, or Firm — Mueting Raasch Group

(57) ABSTRACT

Water-dispersible or water-dispersed polymers are made by reacting (i) an unsaturated monomer containing one or more cyclic carbonate groups, or (ii) an unsaturated or saturated oligomer or polymer containing a plurality of cyclic carbonate groups, with a tertiary amine in the presence of an acid, or with an acid in the presence of a tertiary amine, or in the presence of an acid and a tertiary amine, to provide a water-dispersible or water-dispersed monomer, oligomer or polymer. When step a) provides a monomer or oligomer, the monomer or oligomer is reacted with one or more monomers in the presence of an initiator to provide a water-dispersible or water-dispersed polymer. When step a) provides a polymer, the polymer is optionally used to support emulsion polymerization of one or more unsaturated monomers in the presence of an initiator to provide a water-dispersible or water-dispersed further polymer.

19 Claims, No Drawings

(56) References Cited

U.S. PATENT DOCUMENTS

| | | |
|---|---|---|
| 8,911,874 B2 | 12/2014 | O'Brien et al. |
| 8,927,652 B2 | 1/2015 | Most et al. |
| 9,029,470 B2 | 5/2015 | Rademacher et al. |
| 9,181,448 B2 | 11/2015 | Li et al. |
| 9,296,858 B2 | 3/2016 | Raether et al. |
| 9,404,006 B2 | 8/2016 | Li |
| 9,409,219 B2 | 8/2016 | Niederst et al. |
| 9,670,378 B2 | 6/2017 | Moussa et al. |
| 9,879,149 B2 | 1/2018 | Pierre et al. |
| 2003/0134986 A1 | 7/2003 | Ohrbom et al. |
| 2005/0196629 A1 | 9/2005 | Bariatinsky et al. |
| 2012/0316286 A1 | 12/2012 | Mecfel-Marczewski et al. |
| 2013/0280455 A1 | 10/2013 | Evans et al. |
| 2015/0329733 A1 | 11/2015 | Pierre et al. |
| 2017/0051177 A1 | 2/2017 | Prouvost et al. |
| 2017/0088745 A1 | 3/2017 | Matthieu et al. |
| 2017/0096408 A1 | 4/2017 | Gibanel et al. |
| 2017/0096579 A1 | 4/2017 | Gibanel et al. |

FOREIGN PATENT DOCUMENTS

| | | | |
|---|---|---|---|
| GB | 1242338 | * | 8/1971 |
| JP | 04-180902 | * | 6/1992 |
| JP | 07-62035 | * | 3/1995 |
| JP | 07-206429 | * | 8/1995 |
| JP | 2005/036081 | | 2/2005 |
| JP | 2008/298278 | | 12/2008 |
| JP | 2010/121087 | | 6/2010 |
| WO | WO 1997/023516 | | 7/1997 |
| WO | WO 2015/164692 A1 | | 10/2015 |
| WO | WO 2015/164703 A1 | | 10/2015 |
| WO | WO 2017/180895 A1 | | 10/2017 |
| WO | WO 2018/013766 A1 | | 1/2018 |
| WO | WO 2018/085052 A1 | | 5/2018 |

OTHER PUBLICATIONS

Translation of JP 07-62035 (Year: 1995).*
Translation of JP 07-206429 (Year: 1995).*
BASF, "GCMA: Glycerolcarbonate Methacrylate", Jun. 14, 2017, 2 pages.
Clements, Huntsman Petrochemical Corporation "Reactive Applications of Cyclic Alkylene Carbonates", Jan. 15, 2003, 12 pages.
Evonik Performance Materials GMBH, "VISIOMER® Methacrylates—a Versatile Toolbox for Crosslinking Solutions", Mar. 2017, 2 pages.
Office Action for Chinese Patent Application No. 201880079831, dated Jun. 25, 2021, 11 pages.
Shaikh and Sivaram, "Organic Carbonates," American Chemical Society, May 9, 1996, 3 pages.
Supplemental European Search Report for Application No. EP 18 88 9133, dated Sep. 6, 2021, 7 pages.
Webster, "Cyclic carbonate functional polymers and their applications", Progress in Organic Coatings, vol. 47, Issue 1, Jul. 2003, 2 pages.

* cited by examiner

METHOD FOR MAKING WATER-DISPERSIBLE AND WATER-DISPERSED POLYMERS

CROSS-REFERENCE TO RELATED APPLICATION

This application is a Continuation of Ser. No. 16/771,798 filed Jun. 11, 2020, which is a National Phase Filing under 35 U.S.C. § 371 of International Application No. PCT/US2018/064981 filed Dec. 11, 2018 which claims priority under 35 U.S.C. § 119 to U.S. Provisional Application Ser. No. 62/597,206 filed Dec. 11, 2017 and entitled "METHOD FOR MAKING WATER-DISPERSIBLE AND WATER-DISPERSED POLYMERS", the disclosures of which are incorporated herein by reference.

TECHNICAL FIELD

This invention relates to water-dispersible or water-dispersed polymers, food and beverage container coatings, and coated food and beverage containers.

BACKGROUND

Metal food and beverage containers typically employ interior coatings that prevent the contents from contacting the metal substrate of the container. Such contact can lead to corrosion of the metal and contamination of the packaged product. This is particularly true when the contents of the container are chemically aggressive in nature. Protective coatings are also applied to the interior of food and beverage containers to prevent corrosion in the headspace between the food product fill line and the container lid, and to the exterior of such containers to prevent marring or other damage to the substrate, labels or graphics.

Packaging coatings preferably should be capable of high-speed application to the substrate and should provide the necessary properties when hardened to perform in this demanding end use. For example, the coating should be safe for food contact, not adversely affect the taste of the packaged food or beverage product, have excellent adhesion to the substrate, resist staining and other coating defects such as "popping," "blushing" and "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging and shipping. It has proven very difficult to find coatings that provide satisfactory performance for all required properties.

SUMMARY

A number of container coatings include water-dispersible or water-dispersed polymers. Dispersibility can for example be facilitated by surfactants present in the coating composition or by functional groups on the polymeric binder. Quaternary ammonium groups are one such functional group, and may for example be formed by reacting an oxirane functional group on the polymeric binder with a tertiary amine. Oxirane functional groups may for example be provided in polyether polymers by reacting hydroxyl groups (e.g., phenol groups) in the polyether polymer with epichlorohydrin, and may for example be provided in acrylic polymers or polyether-acrylic copolymers by including glycidyl methacrylate (GMA) among the monomers from which the acrylic polymer segment is formed. Although coating compositions containing (or derived from polymers that contained) oxirane functional groups are widely used and well accepted, it would nonetheless be desirable to provide an alternative reaction method and reactants to deal with potential supply problems or other concerns that might arise in connection with the use of oxirane functional groups. The present invention thus provides, in one aspect, a method for making a water-dispersible or water-dispersed polymer, comprising the steps of:

a) reacting (i) an unsaturated monomer containing one or more cyclic carbonate groups, or (ii) an unsaturated or saturated oligomer or polymer containing a plurality of cyclic carbonate groups, with a tertiary amine in the presence of an acid (or with an acid in the presence of a tertiary amine, or in the presence of an acid and a tertiary amine) to provide a water-dispersible or water-dispersed monomer, oligomer or polymer; and b1) when step a) provides a water-dispersible or water-dispersed monomer or oligomer, reacting such monomer or oligomer with one or more unsaturated or saturated monomers (and preferably saturated monomers) in the presence of an initiator to provide a water-dispersible or water-dispersed polymer; and b2) when step a) provides a water-dispersible or water-dispersed polymer, optionally using such polymer to support emulsion polymerization of one or more unsaturated monomers in the presence of an initiator to provide a water-dispersible or water-dispersed further polymer.

In an embodiment, the reaction in step a) is carried out in solvent, and the reactions in step b1) or step b2), if performed, are carried out in water. In another embodiment, the reactions in step a) and step b1) or step b2) are performed in solvent. In another embodiment, the reaction in step a) is carried out in water, and the reaction in step b1) or step b2), if performed, is also carried out in water.

In an embodiment, the unsaturated monomer in step a) has the formula Ia:

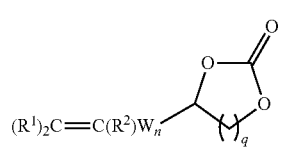

wherein:
  each $R^1$ is independently selected from hydrogen or an organic group;
  $R^2$ is selected from hydrogen or an alkyl group;
  n is 0 or 1;
  W, if present, is a linking group (e.g., a divalent linking group);

represents a methylene group or groups which independently may be substituted or unsubstituted; and
  q is 1 or more, preferably no more than 3, and more preferably is 1 or 2.

In another embodiment, the polymer containing a plurality of cyclic carbonate groups in step a) has the formula Ib:

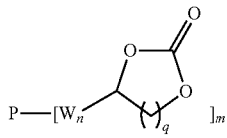
Ib wherein:
P is a polymer backbone;
m is 2 or more, and preferably is such that the indicated bracketed group represents about 1 to about 15 and more preferably about 1 to about 10 wt. % of the polymer; and
n, W,

and q are as defined above.

In another embodiment, the water-dispersible or water-dispersed monomer provided in step a) is an ammonium salt group-containing unsaturated monomer having the formula IIa:

 IIa wherein:
each $R^1$ is independently selected from hydrogen or an organic group;
$R^2$ is selected from hydrogen or an alkyl group;
n, W,

and q are as defined above;
each $R^3$ is independently selected from carbon-containing groups —$CR^4R^5R^6$ where each of $R^4$, $R^5$ and $R^6$ is hydrogen or an organic group; and
$A^-$ is the anion of a deprotonated acid HA.

In another embodiment, the water-dispersible or water-dispersed polymer provided in step a) has the formula IIb:

 IIb wherein:
P, m, n, W,

q, each $R^3$ and $A^-$ are as defined above.

In another embodiment, the water-dispersible or water-dispersed polymer used in step b1) or step b2) has the formula IIIa:

 IIIa wherein:
P, m, n, W,

q, each $R^3$ and $A^-$ are as defined above.

In certain embodiments, the monomer, oligomer or polymer containing a plurality of cyclic carbonate groups in step a) is, or is derived from, glycerol carbonate methacrylate ("GCMA", $C_8H_{10}O_5$, CAS No. 13818-44-5), also referred to "glycerin carbonate methacrylate" or as "(2-oxo-1,3-dioxolan-4-yl)methyl 2-methylprop-2-enoate", and having formula IV:

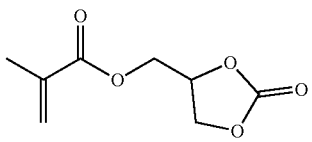
IV

In certain embodiments, the water-dispersible or water-dispersed monomer in step a) is, or the water-dispersible or water-dispersed oligomer or polymer in step b1) or the further polymer step b2) is derivable from, the compound having the formula V:

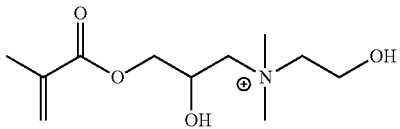
V

In an additional embodiment, the invention provides a food or beverage container coating composition comprising a water-dispersible or water-dispersed polymer made according to any of the above-described methods. In yet another embodiment, the invention provides a food or beverage container or portion thereof having an interior surface coated with a coating composition comprising a water-dispersible or water-dispersed polymer made according to any of the above-described methods. In other embodiments, the invention provides such a food or beverage container, and further comprises a food or beverage sealed inside the container.

DETAILED DESCRIPTION

As used herein, "a," "an," "the," "at least one," and "one or more" are used interchangeably. Thus, for example, a coating composition that contains "a" stabilizer can be interpreted to mean that the coating composition includes "one or more" stabilizers.

The term "backbone" when used with respect to a polymer means a continuous series of covalently bonded atoms that together form a chain (typically the longest chain) in the polymer.

The terms "comprises" and variations thereof do not have a limiting meaning where these terms appear in the description and claims.

The term "crosslinker" refers to a molecule capable of forming a covalent linkage between copolymers (e.g., between polymers) or between two different regions of the same copolymer.

The term "easy open end" refers to a can end (typically an end of a food or beverage container) that includes (i) a frangible opening portion (which for some beverage can ends functions as a drinking spout) and (ii) a riveted portion for attaching a pull tab thereto for purposes of opening the frangible opening portion to access the product housed within a can or container.

The terms "estrogenic activity" or "estrogenic agonist activity" refer to the ability of a compound to mimic hormone-like activity through interaction with an endogenous estrogen receptor, typically an endogenous human estrogen receptor.

The term "ethylenically unsaturated" refers to a carbon-carbon double or triple bond capable of participating in a free-radical initiated polymerization reaction, and is not intended to encompass the carbon-carbon double bonds present in aryl groups such as, for example, the phenyl group of styrene. Thus, for example, dodecyl benzene sulfonic acid is not considered to include an ethylenically unsaturated group.

The term "food-contact" when used in respect to a surface or a coating refers to an exposed surface (e.g., an uncoated substrate or a coating on a substrate) of an article (e.g., a food or beverage container) that is in contact with, or is suitable for extended contact with, a food or beverage product.

The term "functional group" when used in respect to a polymer refers to a group that can react (for example with a molecule of another polymer, a crosslinking agent or a salt) and thereby change properties of the polymer including properties such as molecular weight, solubility, surface energy, further reactivity and the like.

The terms "glass transition temperature" or "Tg" when used in respect to a polymer in a coating composition or a coated article coated with such a composition refer to the measured Tg obtained prior to any cure of such coating composition, and may be measured using differential scanning calorimetry ("DSC").

The term "latex" polymer means a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

The term "extractable" when used with respect to a compound in a coating composition means that the compound can be extracted from the coating composition when a coating (typically ~1 mg/cm$^2$) is exposed to a test medium for some defined set of conditions, depending on the end use. Examples of these testing conditions include exposure of the cured coating to HPLC-grade acetonitrile for 24 hours at 25° C. Other examples include exposure of the cured coating to 3 wt. % acetic acid (a simulant for aqueous and acidic foodstuffs), 10 vol. % ethanol (a simulant for alcoholic foodstuffs containing up to 10% alcohol), 50 vol. % ethanol (a simulant for milky foodstuffs), rectified olive oil, or alternatives to olive oil such as 95 vol. % ethanol, isooctane or modified polyphenylene oxide (MMPO). Exemplary procedures and limits are set out in European Union Commission Directives 82/711/EEC, 93/8/EEC and 97/48/EC and in 21 CFR section 175.300, paragraphs (d) and (e). For instances in which such extraction procedures do not accurately discriminate between a particular compound and one or more derivatives of such compound (e.g., between a bisphenol and the diglycidyl ether or diglycidyl ester of such bisphenol), then the amount of such compound shall be deemed to be the detected combined extracted amount of the particular compound and its derivatives.

The term "oligomer" refers to a molecule that consists of two, three or four monomer units. Typically, if one of the monomer units is removed from an oligomer, its chemical properties will be appreciably altered.

The term "on," when used in the context of a coating applied on a surface or substrate, includes both coatings applied directly or indirectly to the surface or substrate. Thus for example, a coating applied to a primer layer overlying a substrate constitutes a coating applied on the substrate.

The term "organic group" means a hydrocarbon group (with optional elements other than carbon and hydrogen, such as oxygen, nitrogen, sulfur, and silicon) that may be further classified as an aliphatic group, cyclic group (e.g., aromatic and cycloaliphatic groups), or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group (e.g., an n-propyl isopropyl group). The term "alkenyl group" means an unsaturated, linear or branched hydrocarbon group with one or more carbon-carbon double bonds (e.g., a vinyl group). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. A group that may be the same as or different from other groups may be referred to as being "independently" something. Substitution on the organic groups of compounds of the present invention is contemplated. The terms "group" and "moiety" may be used to differentiate between chemical species that allow for substitution or that may be substituted and those that do not allow or may not be so substituted. The term "group" is intended to be a recitation of both the particular moiety, as well as a recitation of the broader class of substituted and unsubstituted structures that includes the moiety. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, isopropyl, t-butyl, heptyl, dodecyl, octadecyl, amyl, 2-ethylhexyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, isopropyl, t-butyl, heptyl, dodecyl, octadecyl, amyl, 2-ethylhexyl, and the like.

The term "pendant group" when used with respect to a polymer refers to a group (viz., a side group) attached to the polymer at one or more atoms located between end atoms of the polymer backbone. Typically, a pendant group may be a functional or a non-functional group.

The term "polyphenol" refers to a polyhydric material having at least two phenylene groups that each include a six-carbon ring and at least one hydroxyl group attached to a carbon atom of the ring, wherein the rings of the phenylene groups do not share any atoms in common.

Unless otherwise indicated, the term "polymer" includes both homopolymers and copolymers (e.g., polymers of two or more different monomers). Similarly, unless otherwise indicated, the use of a term designating a polymer class such as, for example, "polyether" is intended to include both homopolymers and copolymers (e.g., polyether-acrylate copolymers).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "substantially free" when used with respect to a coating composition that may contain a particular compound means that the coating composition contains less than 1,000 parts per million (ppm) by weight of the recited compound. The term "essentially free" when used with respect to a coating composition that may contain a particular compound means that the coating composition contains less than 100 parts per million (ppm) by weight of the recited compound. The term "essentially completely free" when used with respect to a coating composition that may contain a particular compound means that the coating composition contains less than 5 parts per million (ppm) of the recited compound. The term "completely free" when used with respect to a coating composition that may contain a particular compound means that the coating composition contains less than 20 parts per billion (ppb) by weight of the recited compound. When the phrases "free of" (outside the context of the aforementioned phrases), "does not include any" and the like are used herein, such phrases are not intended to preclude the presence of trace amounts of the pertinent structure or compound which may be present as environmental contaminants or due to environmental contamination.

The term "terminal group" when used with respect to a polymer refers to a group attached to a polymer at one or more end atoms of the polymer backbone. Typically, a terminal group will be a functional group.

The term "unsaturated" when used in the context of a compound refers to a compound that includes at least one non-aromatic (e.g., aliphatic) carbon-carbon double or triple bond.

The term "water-dispersible" when used with respect to a polymer means a polymer which is capable of being combined by itself with water, without requiring the use of a secondary dispersing or emulsifying agent, to obtain an aqueous dispersion or emulsion of polymer particles having at least a one month shelf stability at normal storage temperatures.

The term "water-dispersed" when used with respect to a polymer means that the polymer is present as an aqueous dispersion or emulsion of polymer particles having at least a one month shelf stability at normal storage temperatures.

Also herein, the recitations of numerical ranges by endpoints include all numbers subsumed within that range (e.g., 1 to 5 includes 1, 1.5, 2, 2.75, 3, 3.80, 4, 5, and the like).

DETAILED DESCRIPTION

A variety of water-dispersible or water-dispersed polymers may be made using the disclosed method. Exemplary water-dispersible polymers include polyethers, poly(meth)acrylates, vinyls, polyesters, alkyds and other oil-modified polymers, polyurethanes, polyamides, polyolefins, and mixtures or copolymers thereof (for example, polyether-acrylic copolymers). Exemplary water-dispersed polymers include water-dispersible polymers that have been dispersed in water, and polymer dispersions that are formed via aqueous polymerization such as latex emulsions. The disclosed method may also be used to prepare mixtures of water-dispersible or water-dispersed polymers with polymers that are not water-dispersible or water-dispersed.

In one embodiment, the water-dispersible or water-dispersed polymer is a polymeric surfactant that may be made for example via solution polymerization and then used to facilitate aqueous polymerization of another polymer or copolymer. In packaging applications, it is generally desirable to use a polymerizable or polymeric surfactant to, for example, minimize or eliminate the possibility of surfactant migrating out of a cured coating and into the packaged product. Examples of suitable polymeric surfactants may include water-dispersible polymers of the acrylic, alkyd, polyester, polyether, polyolefin, or polyurethane type, including copolymers thereof (e.g., polyether-acrylic copolymers), and mixtures thereof.

The disclosed method employs cyclic carbonate group-containing monomers, oligomers or polymers. The disclosed cyclic carbonate groups may for example have five-membered rings (e.g., 2-oxo-1,3-dioxolan-4-yl rings) or six-membered rings (e.g., 2-oxo-1,3-dioxan-5-yl rings), and are esters of carbonic acid containing a carbonyl group flanked by two alkoxy groups linked to one another and joined through such linkage to the remaining portion of the monomer, oligomer or polymer. For the disclosed unsaturated monomers and unsaturated oligomers, such remaining portion typically will contain one or more vinylic, acrylic or methacrylic groups. For the disclosed polymers, the remaining portion, if unsaturated, typically will contain one or more vinylic, acrylic or methacrylic groups.

In one embodiment, an unsaturated monomer containing one or more cyclic carbonate groups has the formula Ia:

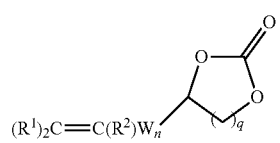

wherein:
each $R^1$ is independently selected from hydrogen or an organic group;
$R^2$ is selected from hydrogen or an alkyl group;
n is 0 or 1;
W, if present, is a linking group (e.g., a divalent linking group);

represents a methylene group or groups which independently may be substituted or unsubstituted; and q is 1 or more, preferably no more than 3, and more preferably is 1 or 2.

In some embodiments, the monomer of Formula Ia is a vinyl monomer (e.g., an acrylate or vinyl ester) and $R^2$ and both $R^1$ are hydrogen. In some embodiments, the monomer of Formula Ia is an olefin monomer, at least one $R^1$ is an alkyl moiety (e.g., a methyl (—$CH_3$) or ethyl (—$CH_2CH_3$) moiety), and $R^2$ is hydrogen or an alkyl moiety and more preferably hydrogen or a methyl moiety.

When present, W is typically a heteroatom-containing linkage (e.g., linkages including at least one or more heteroatoms such as N, O, P, S, etc.). Examples of suitable heteroatom-containing linkages include, for example, those formed by reacting two complimentary reactive functional groups (e.g., —OH and —COOH) such as are used, for example, to produce condensation linkages and the like. Example of suitable heteroatom containing-linkages include amide, carbonate ester, ester, ether, urea, and urethane linkages. Ester linkages of either directionality (—C(O)—O— or —O—C(O)—) are preferred such linkages. In some embodiments, W is an ester linkage, the carbonyl atom of the ester is attached to an unsaturated carbon atom of a monomer or oligomer or to a polymer backbone, and the ether oxygen of the ester is attached to a carbon atom of the cyclic carbonate ring.

Exemplary unsaturated monomers containing cyclic carbonate groups include 4-vinyl-1,3-dioxolan-2-one (CAS No. 4427-96-7); 4-[(ethenyloxy)methyl]-1,3-dioxolan-2-one (CAS No. 115089-62-8); 4-(4-ethenylphenyl)methoxy)methyl)-1,3-dioxolan-2-one; glycerin carbonate vinyl ether; (2-oxo-1, 3-dioxolan-4-yl) methyl acrylate ("GCA"), GCMA, and (5-ethyl-2-oxo-1,3-dioxan-5-yl)methyl 2-methylprop-2-enoate (CAS No. 160808-60-6). GCMA is a preferred unsaturated monomer containing a cyclic carbonate group.

Exemplary cyclic carbonate group-containing unsaturated oligomers are unsaturated di-, tri- or higher cyclic carbonate group-functional counterparts of the cyclic carbonate group-containing monomers mentioned above. Cyclic carbonate group-containing monomers are generally preferred over cyclic carbonate group-containing oligomers due in part to the wider commercial availability of such monomers.

A variety of saturated or unsaturated polymers containing a plurality of cyclic carbonate groups may be used in step a) in place of or in addition to the disclosed unsaturated monomers or unsaturated oligomers. In an embodiment, a polymer containing a plurality of cyclic carbonate groups in step a) has the formula Ib:

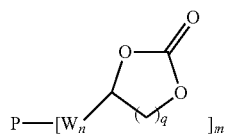

wherein:
P is a polymer backbone;
m is 2 or more, and preferably is such that the indicated bracketed group represents about 1 to about 15 and more preferably about 1 to about 10 wt. % of the polymer;

n is 0 or 1;
W, if present, is a linking group as described above;

represents a methylene group or groups which independently may be substituted or unsubstituted; and
q is 1 or more, preferably no more than 3, and more preferably is 1 or 2.

P in formula Ib may be saturated or unsaturated and may be any of the above-mentioned water-dispersible or water-dispersed polymers.

In an embodiment of step a), an unsaturated monomer containing one or more cyclic carbonate groups is reacted with a prepolymer (e.g., an unsaturated prepolymer) and one or more unsaturated monomers in the presence of an initiator to provide an addition polymer containing a plurality of cyclic carbonate groups, and the addition polymer is reacted with a tertiary amine in the presence of an acid (or is reacted with an acid in the presence of a tertiary amine, or is reacted in the presence of an acid and a tertiary amine) to provide a water-dispersible or water-dispersed addition polymer.

In the above-mentioned step a), the disclosed monomer, oligomer or polymer containing cyclic carbonate groups is reacted with a tertiary amine in the presence of an acid (or is reacted with an acid in the presence of a tertiary amine, or is reacted in the presence of an acid and a tertiary amine) to provide a water-dispersible or water-dispersed monomer, oligomer or polymer. Without intending to be bound by theory, it is believed that under such conditions the cyclic carbonate group, amine and acid form a quaternary ammonium salt group. This group promotes water dispersibility of polymeric products. This reaction can be distinguished from the crosslinking reaction that can take place between a monomer, oligomer or polymer containing cyclic carbonate groups and a primary or secondary amine, as the latter reaction forms a dimer, larger oligomer or a crosslinked polymer network whereas the reaction of a cyclic carbonate group with a tertiary amine is believed to modify the cyclic carbonate group to form a new group.

A variety of tertiary amines may be employed in the disclosed method. Exemplary tertiary amines have the formula —$N(R^3)_3$ wherein $R^3$ is as defined above. Preferably each $R^3$ is a substituted (e.g., hydroxyl-substituted) or unsubstituted monovalent alkyl group, preferably containing 1 to 8 carbon atoms, and more preferably containing 1 to 4 carbon atoms. Some examples of suitable tertiary amines include trimethyl amine, dimethyl ethanol amine (also known as dimethyl amino ethanol), methyl diethanol amine, ethyl methyl ethanol amine, dimethyl ethyl amine, dimethyl propyl amine, dimethyl 3-hydroxy-1-propyl amine, dimethylbenzyl amine, dimethyl 1-hydroxy-2-propyl amine, dimethyl 2-hydroxy-1-propyl amine, diethyl methyl amine, triethyl amine, tributyl amine, N-methyl morpholine and mixtures thereof. Other examples of tertiary amines are disclosed, for example, in U.S. Pat. No. 4,021,396 (Wu), U.S. Pat. No. 4,247,439 (Matthews et al.), U.S. Pat. No. 4,442,246 (Brown et al.), U.S. Pat. No. 4,446,258 (Chu et al. '258), U.S. Pat. No. 4,476,262 (Chu et al. '262), U.S. Pat. No. 4,480,058 (Ting et al.), U.S. Pat. No. 5,296,525 (Spencer), U.S. Pat. No. 5,830,952 (Pedersen et al.) and U.S. Pat. No. 6,300,428 (Stevenson et al.). Most preferably trimethyl amine or dimethyl ethanol amine is used as the tertiary amine.

The amount of tertiary amine employed is typically determined by various factors. For the formation of stable dispersions, the disclosed method preferably employs at least 0.8 equivalents, and more preferably at least 1 equivalent, of tertiary amine per equivalent of cyclic carbonate groups. The amine amount may also be increased as the acid amount (discussed in more detail below) is increased, so as to help maintain a stable dispersion. Excess amine may form a salt with some or all of the excess acid. It is preferred that an excess of amine equivalents over acid group equivalents be avoided in the disclosed coating compositions. The stoichiometric ratio of amine to cyclic carbonate groups ("A:CC") can influence the viscosity of the composition. In general as the A:CC ratio increases, viscosity decreases. It should be noted that this trend may not always be true as dispersion conditions have been found to also impact viscosity. Additional amine may be added after the polymer has been dispersed to further adjust viscosity.

A variety of acids HA may be employed in step a) of the disclosed method. Exemplary acids include organic acids such as acidic monomers, acidic oligomers and acidic polymers, and inorganic acids such as mineral acids. For many applications, acidic monomers or acidic polymers will be preferred. In embodiments involving aqueous polymerization in step a), the acid preferably is water-soluble, with for example water solubility of at least 5 wt. %, at least 10 wt. %, at least 20 wt. %, at least 50 wt. % or complete water miscibility. It should be understood that usable acids include acid precursors that may be used in place of or in addition to the acid itself, such as acid anhydrides, acid halides (including inorganic acid halides such as Lewis acids and organic acid halides), and other acids that may be generated in situ e.g., by deliberate hydrolysis of an ester.

Preferred acidic monomers are unsaturated and thus include a reactive (viz., free-radically polymerizable) carbon-carbon double bond and an acidic group (e.g., a carboxylic, sulfonic or phosphorus acid group), or anhydride thereof. The acid may be monounsaturated or polyunsaturated (e.g., alpha, beta-unsaturated), and may be a monoacid (e.g., a monocarboxylic acid) or a polyacid (e.g., a dicarboxylic acid). Exemplary acidic monomers include, but are not limited to, acrylic acid, methacrylic acid, alpha-chloroacrylic acid, alpha-cyanoacrylic acid, beta-methyl acrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-stearylacrylic acid, itaconic acid, citraconic acid, mesaconic acid, glutaconic acid, aconitic acid, maleic acid, fumaric acid, tricarboxyethylene, maleic anhydride, and mixtures thereof.

Preferred acidic oligomers are unsaturated or saturated di-, tri- or higher acid-functional counterparts of the acidic monomers mentioned above. Acidic monomers are generally preferred over acidic oligomers due in part to the wider commercial availability of such monomers.

The acid may also or instead be an acidic polymer. Suitable acidic polymers include poly-acid or poly-anhydride polymers, e.g., homopolymers or copolymers prepared from ethylenically unsaturated acid or anhydride monomers (e.g., carboxylic acid or carboxylic anhydride monomers) and other optional monomers (e.g., vinyl monomers). Acid-functional polyester polymers may also be utilized. In one embodiment, the acidic polymer is a water-dispersible polymer, for example a "higher" acid number acid-functional polymer such as a polymer having an acid number greater than about 40, and preferably greater than about 100 milligrams KOH per gram of polymer, and a number average molecular weight (Mn) of, for example, greater than about 2,000 Daltons or greater than about 4,000 Daltons. In another embodiment, the acidic polymer is an acrylic polymer having an acid number greater than about 40, and preferably greater than about 100 milligrams KOH per gram of polymer.

In another embodiment, the acid is an acrylic polymer containing a plurality of cyclic carbonate groups. Such a polymer may be provided as is or formed in situ (e.g., via solution polymerization in a suitable organic solvent) and then inverted into water via reaction of some or all of the cyclic carbonate groups with the tertiary amine in the presence of acid as described herein. The weight ratio of cyclic carbonate groups to acidic groups may for example be at most 90:10, at most 87:13, or at most 84:16. The weight ratio of cyclic carbonate groups to acidic groups may for example be at least 50:50, at least 70:30, or at least 80:20.

Preferred acidic polymers include those prepared by conventional free radical polymerization techniques using at least 15, more preferably at least 20 wt. %, unsaturated acid-functional monomer and the balance other unsaturated monomer(s). The choice of such unsaturated monomer(s) is dictated by the intended end use of the coating composition and is practically unlimited. This polymerization reaction is conveniently carried out in solution, though other neat processes may be used if desired. A variety of acid-functional and anhydride-functional monomers may be used. Their selection is dependent on the desired properties for the final polymer product.

Suitable ethylenically unsaturated acid-functional monomers and anhydride-functional monomers for preparing acidic polymers include monomers having a reactive carbon-carbon double bond and an acidic or anhydride group. Preferred such monomers have from 3 to 20 carbons, 1 to 4 sites of unsaturation, and from 1 to 5 acid or anhydride groups or salts thereof. Exemplary acid-functional monomers include ethylenically unsaturated acids (mono-protic or diprotic), anhydrides and monoesters of dibasic acids copolymerizable with the optional other monomer(s) used to prepare the acidic polymer. Illustrative monobasic acids include those represented by the structure $CH_2=C(R^7)COOH$, where $R^7$ is hydrogen or an alkyl group of 1 to 6 carbon atoms. Suitable dibasic acids include those represented by the formulas $R^8(COOH)C=C(COOH)R^9$ and $R^8(R^9)C=C(COOH)R^{10}COOH$, where R 8 and $R^9$ are hydrogen, an alkyl group of 1 to 8 carbon atoms, halogen, cycloalkyl of 3 to 7 carbon atoms or phenyl, and $R^{10}$ is an alkylene group of 1 to 6 carbon atoms. Half-esters of these acids with alkanols of 1 to 8 carbon atoms are also suitable.

Exemplary ethylenically unsaturated acid-functional monomers include acids such as, for example, acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like or mixtures thereof. If desired, salts of the above acids may also or instead be employed. Preferred unsaturated acid-functional monomers include acrylic acid, methacrylic acid, crotonic acid, fumaric acid, maleic acid, 2-methyl maleic acid, itaconic acid, 2-methyl itaconic acid and mixtures thereof. More preferred unsaturated acid-functional monomers include acrylic acid, methacrylic acid, crotonic acid, fumaric acid, maleic acid, itaconic acid, and mixtures thereof. Most preferred unsaturated acid-functional monomers include acrylic acid, methacrylic acid, maleic acid, crotonic acid, and mixtures thereof.

Examples of suitable ethylenically unsaturated anhydride monomers include compounds derived from the above acids (e.g., as a pure anhydride or mixtures of such). Preferred anhydrides include acrylic anhydride, methacrylic anhydride, and maleic anhydride.

Suitable other monomers for use in the acidic polymers include alkyl (meth)acrylates, vinyl monomers, and the like. It is generally preferred that amine-functional monomers be avoided.

Exemplary acid-functional polymers may be prepared by polymerizing suitable monomers, in proper amounts, in a suitable carrier (e.g., an organic liquid medium). Preferably, the liquid medium for such polymerization is an alcohol mixture. A catalyst or polymerization initiator is ordinarily employed, in amounts that will be familiar to persons having ordinary skill in the art. Exemplary catalysts or initiators include free radical initiators such as azoalkanes, peroxides, tertiary butyl perbenzoate, tertiary butyl peroxypivalate, and tertiary butyl peroxyisobutyrate.

Preferred acid-functional polymers may for example have an acid number of at least 30, at least 100, at least 150, or at least 200 mg KOH/gram solid. Preferred acid-functional polymers may for example also have an acid number of at most 500, at most 400, at most 350, or at most 320 mg KOH/gram solid. For example, 23 wt. % of methacrylic acid (MAA) would provide a polymer of approximately 150 acid number. Preferred acid-functional polymers may have an Mn of at least 2,000, at least 3,000, at least 4,000, or at least 5,000. Preferred acid-functional polymers may also have an Mn of at most 15,000, at most 12,000, at most 9,000, or at most 6,000.

In one preferred general embodiment, the acid-functional polymer may be prepared from a reaction mixture that includes (by weight) 5 to 20 parts styrene, 30 to 70 parts alkyl (meth)acrylate, and 30 to 70 parts acidic-functional monomer. In one specific embodiment, the acid-functional polymer may be prepared from a reaction mixture that includes (by weight) 10 parts styrene, 45 butyl methacrylate, and 45 parts MAA. In another specific embodiment, the acid-functional polymer may be prepared from a reaction mixture that includes (by weight) 30 parts styrene, 10 parts ethyl acrylate, and 60 parts MAA. These embodiments are illustrative of suitable such polymers.

Other acids may instead or also be employed including non-polymerizable carboxylic acids, sulfonic acids or phosphorus acids; nitric and nitrous acids; hydrogen halides such as hydrogen fluoride, hydrogen chloride, hydrogen bromide and hydrogen iodide; other mineral acids such as boric acid and sulfuric acid; silicic acids; and phenols. Exemplary water-soluble acid salts of such acids include sodium, potassium, lithium, magnesium, calcium and iron salts. Mixtures of acids, acid anhydrides and acid salts may be employed. Exemplary such other acids include acetic acid ($C_2H_4O_2$, CAS No. 64-19-7), citric acid ($C_6H_8O_7$, CAS No. 77-92-0), formic acid ($CH_2O_2$, CAS No. 64-18-6) and benzoic acid ($C_7H_6O_2$, CAS No. 65-86-0). Exemplary carboxylic acid salts include sodium acetate (CAS No. 127-09-3), potassium acetate (CAS No. 127-08-2), lithium acetate (CAS No. 6108-17-4), ammonium acetate (CAS No. 631-61-8), sodium citrate (CAS No. 6132-04-3), potassium citrate (CAS No. 866-84-2 or 7778-49-6), lithium citrate (CAS No. 919-16-4), ammonium citrate (CAS No. 1185-57-5) and ammonium citrate dibasic (CAS No. 3012-65-5).

Exemplary phosphorus acids include phosphoric acid ($H_3PO_4$, CAS No. 7664-38-2), pyrophosphoric acid ($H_4O_7P_2$, CAS No. 2466-09-03), polyphosphoric acid ($H_{n+2}P_nO_{3n+1}$, CAS No. 8017-16-1), phosphonic acid ($H_3PO_3$, CAS No. 13598-36-2), phosphinic acid ($H_3PO_2$, CAS No. 6303-21-5), ethyl phosphonic acid ($C_2H_7O_3P$, CAS No. 15845-66-6) and hypophosphoric acid ($H_2PO_3$, CAS No. 7803-60-3). Exemplary phosphorus acid salts include ammonium dihydrogen phosphate ($NH_4H_2PO_4$, CAS No. 7722-76-1), diammonium hydrogen phosphate (($NH_4)_2HPO_4$, CAS No. 7783-28-0), calcium dihydrogen phosphate ($Ca(H_2PO_4)_2$, CAS No. 7758-23-8), calcium monohydrogen phosphate dihydrate ($CaHPO_4 \cdot 2H_2O$, CAS No. 7789-77-7), calcium phosphate tribasic ($Ca_3(PO_4)_2 \cdot H_2O$, CAS No. 7758-87-4), ferric phosphate ($FePO_4$, CAS No. 10045-86-0), lithium orthophosphate ($Li_3PO_4$, CAS No. 10377-52-3), magnesium ammonium phosphate hydrate (($NH_4)MgPO_4$, CAS No. 7785-21-9), magnesium hydrogen phosphate trihydrate ($MgHPO_4 \cdot 3H_2O$, CAS No. 7757-86-0), potassium dihydrogen phosphate ($KH_2PO_4$, CAS No. 7778-77-0), dipotassium hydrogen phosphate ($K_2HPO_4$, CAS No. 7758-11-4), dipotassium hydrogen phosphate trihydrate ($K_2HPO_4 \cdot 3H_2O$, CAS No. 16788-57-1), potassium orthophosphate ($K_3PO_4$, CAS No. 7778-53-2), potassium diphosphate ($K_4P_2O_7$, CAS No. 7320-34-5), sodium dihydrogen phosphate ($NaH_2PO_4$, CAS No. 7558-80-7), sodium phosphate monobasic monohydrate ($NaH_2PO_4 \cdot H_2O$, CAS No. 10049-21-5), disodium hydrogen phosphate ($Na_2HPO_4$, CAS No. 7558-79-4), disodium phosphate dibasic dodecahydrate ($Na_2HPO_4 \cdot 12H_2O$, CAS No. 10039-32-4), disodium phosphate dibasic heptahydrate ($Na_2HPO_4 \cdot 7H_2O$, CAS No. 7782-85-6), trisodium phosphate ($Na_3PO_4$, CAS No. 7601-54-9), sodium phosphate tribasic dodecahydrate ($Na_3PO_4 \cdot 12H_2O$, CAS No. 10101-89-0), sodium metaphosphate ($NaPO_3$, CAS No. 10361-03-2), disodium pyrophosphate ($Na_2H_2P_2O_7$, CAS No. 7758-16-9), tetrasodium pyrophosphate ($Na_4O_7P_2$, CAS No. 7722-88-5), sodium trimetaphosphate ($Na_3P_3O_9$, CAS No. 7785-84-4), sodium tripolyphosphate ($Na_5O_{10}P_3$, CAS No. 13573-18-7), hexasodium tetraphosphate ($Na_6O_{13}P_4$, CAS No. 14986-84-6) and sodium polymetaphosphate (CAS No. 50813-16-6). Exemplary silicic acids and salts include sodium silicate (CAS No. 15859-24-2), disodium metasilicate (CAS No. 6834-92-0), silicic acid sodium salt (CAS No. 1344-09-8), potassium silicate (CAS No. 1312-76-1), lithium silicate (CAS No. 10102-24-6), magnesium silicate and ammonium silicate. Carboxylic acids and anhydrides are preferred, as are sodium and ammonium salts of carboxylic acids.

The amount of acid employed is typically determined by various factors. It is preferred that an excess of acid equivalents over amine group equivalents be employed. Lower acid amounts may be employed at a potential sacrifice in polymeric dispersion stability. If a non-polymerizable acid, acid anhydride or salt is employed, the amount thereof preferably is about 1 to about 10 wt. % of the amount of water-dispersible or water-dispersed polymer to be formed.

The disclosed reaction in step a) forms a water-dispersible or water-dispersed monomer, oligomer or polymer. In one embodiment, an aqueous solution (or dispersion) of a tertiary amine is brought in contact with a solution (or dispersion) of the unsaturated monomer, oligomer or polymer containing a plurality of cyclic carbonate groups, in the presence of a solution (or dispersion) of an acidic polymer or other acid. A wide variety of carriers can be used to dissolve or disperse (and preferably to dissolve) the recited ingredients. Among the most commonly used carriers are alcohols such as isopropanol, the butyl alcohols, 2-hydroxy- 4-methyl-pentane, 2-ethylhexyl alcohol and cyclohexanol; glycols such as ethylene glycol, diethylene glycol and 1,3-butylene glycol; ether alcohols such as ethylene glycol mono-ethyl ether, ethylene glycol mono-butyl ether and diethylene glycol mono-methyl ether; mixtures thereof, and many aliphatic and aromatic hydrocarbons particularly if used admixed with at least one of the above carriers.

In an embodiment, a preferred monomer that may be formed in step a) in the presence of the acid HA has the formula IIa:

wherein:

each $R^1$ is independently selected from hydrogen or an organic group;

$R^2$ is selected from hydrogen or an alkyl group;

n is 0 or 1;

W, if present, is a linking group as described above;

represents a methylene group or groups which independently may be substituted or unsubstituted;

q is 1 or more, preferably no more than 3, and more preferably is 1 or 2;

each $R^3$ is independently selected from carbon-containing groups —$CR^4R^5R^6$ where each of $R^4$, $R^5$ and $R^6$ is hydrogen or an organic group; and $A^-$ is the anion of the deprotonated acid HA.

In another embodiment, a preferred polymer that may be formed in step a) in the presence of the acid HA has the formula IIb:

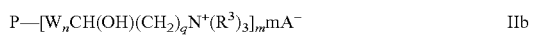

wherein:

P is a polymer backbone as described above;

m is 2 or more, and preferably is such that the indicated bracketed group represents about 1 to about 15 and more preferably about 1 to about 10 wt. % of the polymer;

n is 0 or 1;

W, if present, is a linking group as described above;

represents a methylene group or groups which independently may be substituted or unsubstituted;

q is 1 or more, preferably no more than 3, and more preferably is 1 or 2; each $R^3$ is independently selected from carbon-containing groups —$CR^4R^5R^6$ where each of $R^4$, $R^5$ and $R^6$ is hydrogen or an organic group; and $A^-$ is the anion of the deprotonated acid HA.

Water-dispersibility of the unsaturated monomer, unsaturated oligomer or polymer formed in step a) may be aided by the inclusion of one or more other salt groups that facilitate stable dispersion into water. Examples of suitable such polymer salts are disclosed in U.S. Pat. No. 8,092,876 (O'Brien '876) and U.S. Pat. No. 9,404,006 B2 (Li), and in International Application No. PCT/US2017/041858 filed Jul. 13, 2017 and entitled "Latex Coating Composition Having Reduced Flavor Scalping Properties".

When step a) does not provide a water-dispersible or water-dispersed polymer (viz., if step a) provides only a monomer or oligomer), then in the above-disclosed step b1) a water-dispersible or water-dispersed polymer is formed by reacting such monomer or oligomer with one or more unsaturated or saturated monomers (and preferably saturated monomers) in the presence of an initiator to provide a water-dispersible or water-dispersed polymer.

When step a) provides a water-dispersible or water-dispersed polymer, then in the above-disclosed step b2) such polymer may optionally be used to support emulsion polymerization of one or more unsaturated monomers in the presence of an initiator to provide a water-dispersible or water-dispersed further polymer. Step b2) is an especially preferred synthetic route.

Without being bound by theory, the above-mentioned reaction in step a) is thought to take place between the recited unsaturated monomer, oligomer or polymer containing cyclic carbonate groups and the recited tertiary amine in the presence of an acid. However, the reaction may instead or in addition take place between the recited unsaturated monomer, oligomer or polymer containing cyclic carbonate groups and the recited acid in the presence of a tertiary amine, or may instead or in addition take place in the presence of the acid and tertiary amine. Expressed somewhat differently, the unsaturated monomer, oligomer or polymer may react first with the tertiary amine, or may react first with the acid, or the acid and tertiary amine may react first with one another and thence with the unsaturated monomer, oligomer or polymer. The unsaturated monomer, oligomer or polymer, tertiary amine and acid may accordingly be said simply to react in the presence of one another.

Again without being bound by theory, although the exact mode of reaction in step b1) or step b2) is not fully understood, it is believed that a competition between two reactions may exist. One reaction may involve the free tertiary amine reacting directly with a cyclic carbonate group. A second reaction may involve the tertiary amine first reacting with the acidic polymer or other acid to form an amine-neutralized ion which can then react with a cyclic carbonate group. The products that are formed may include a quaternary ammonium salt and a hydroxy ester. A potential reaction scheme for a reaction employing an acidic polymer P1, a tertiary amine $NR^1R^2R^3$, and a polymer P2 containing cyclic carbonate groups derived from GCMA is shown below:

-continued

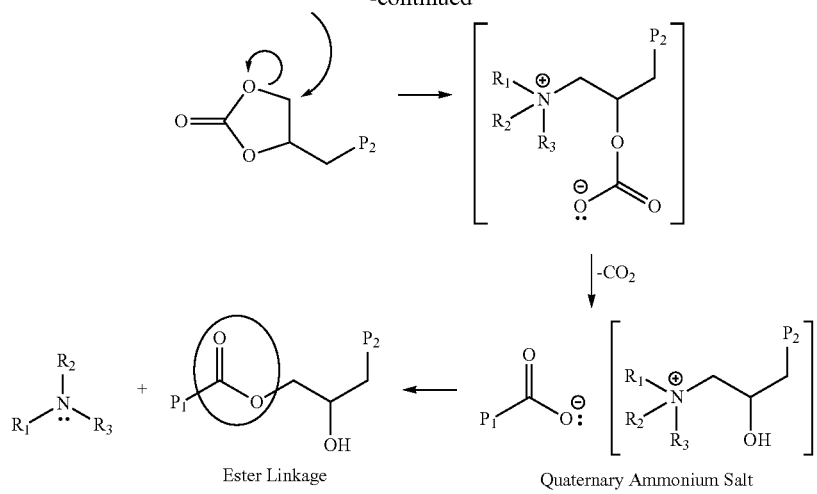

Ester Linkage      Quaternary Ammonium Salt

The reaction conditions, including the presence of water as a reaction modifier, can be chosen to favor either the presumed quaternary ammonium salt or ester product. A high level of quaternization may improve water dispersibility while a high level of esterification may result in higher viscosity and possibly a gel-like material. By varying the ratio of the reactants and reaction conditions, the solids content, viscosity, particle size and application properties of the product can be varied over a wide range. Typically, the reaction does not proceed at room temperature, and will require an elevated temperature (viz., a temperature substantially above room temperature) to take place and reach completion. Preferably, the reaction is carried out at a temperature of at least 70° C., more preferably at least 80° C., and most preferably at least 90° C. Preferably, the reaction is carried out at a temperature below the boiling point of the reaction medium, and more preferably at a temperature of at most 100° C. In general, the disclosed reaction requires higher temperatures than the typical temperatures (e.g., temperatures at or below 60° C.) required for reactions between a tertiary amine and an oxirane group. Pressures above or below ambient pressure may if desired be used to control or guide the reaction.

In another method for preparing a water-dispersible or water-dispersed polymer, a cyclic carbonate group-containing polymer is dissolved in a suitable carrier such as the monobutyl ether of ethylene glycol or diethylene glycol, followed by the addition of a suitable tertiary amine to form a polymeric product believed to be a polymeric quaternary ammonium hydroxide. After such formation is substantially complete, an acidic polymer or other acid, dissolved or dispersed as need be in a suitable carrier, is added with mixing and agitation. The resulting solution or dispersion may also contain additional suitable amine, dissolved in water, as needed to promote adequate dispersibility. This sequence of steps may be carried out at a variety of temperatures, e.g., at temperatures below the boiling point of the reaction media.

The water-dispersible or water-dispersed polymer or further polymer resulting from step a), step b1) or step b2) (viz., the "eventual polymer") may have a variety of characteristics depending upon the intended end use. In one embodiment, the eventual polymer may have the formula IIIa:

$$P\text{—}[W_n CH(OH)(CH_2)_q N^+(R^3)_3]_m mA^- \quad \text{IIIa}$$

wherein:
P is a polymer backbone as described above;
m is 2 or more, and preferably is such that the indicated bracketed group represents about 1 to about 15 and more preferably about 1 to about 10 wt. % of the polymer;
n is 0 or 1;
W, if present, is a linking group as described above;

represents a methylene group or groups which independently may be substituted or unsubstituted;
q is 1 or more, preferably no more than 3, and more preferably 1 or 2;
each $R^3$ is independently selected from carbon-containing groups —$CR^4R^5R^6$ where each of $R^4$, $R^5$ and $R^6$ is hydrogen or an organic group; and
$A^-$ is the anion of a deprotonated acid HA.

The characteristics of the eventual polymer may depend in part upon factors such as the polymer backbone and the number of potential or presumed quaternary ammonium salt groups. In certain preferred embodiments, the eventual polymer is an acrylic polymer, and in additional preferred embodiments the eventual polymer has a Tg of at least about 30° C., at least about 40° C. or at least about 50° C. In some preferred embodiments, the presumed quaternary ammonium salt group functionality of the eventual polymer will be at least 0.5, more preferably at least 0.9, even more preferably at least 1.2, and most preferably at least 1.4. The presumed quaternary ammonium salt group functionality of the eventual polymer may preferably be at most 5, more preferably at most 3, even more preferably at most 2.5, and most preferably at most 2. While not intending to be bound by theory, a presumed quaternary ammonium salt group functionality greater than about 5 may promote premature polymer gelation and a presumed quaternary ammonium salt group functionality below about 0.5 may be insufficient to provide the desired dispersibility and physical properties.

It is presently believed that for certain container coating applications, the number average molecular weight (Mn) of the eventual polymer is preferably at least 2,500, more preferably at least 4,000, even more preferably at least 5,000, and most preferably at least 6,000, with Mn being determined using gel permeation chromatography and a polystyrene standard. It is also presently believed that for certain container coating applications, the Mn of the eventual polymer is preferably at most 20,000, more preferably at most 16,000, even more preferably at most 12,000, and most preferably at most 8,000.

Using the above quaternary ammonium salt group functionality figures as a guide, and using an cyclic carbonate monomer with a molecular weight similar to GCMA, for a 7,000 Mn eventual polymer the amount of cyclic carbonate monomer to be used will preferably be at least 1, more preferably at least 2, even more preferably at least 2.5, and most preferably at least 3 wt. %, based on the weight of the other monomers used to form the eventual polymer. Using the above quaternary ammonium salt group functionality figures as a guide, and using a cyclic carbonate monomer with a molecular weight similar to GCMA, for a 7,000 Mn eventual polymer the amount of cyclic carbonate monomer to be used may suitably be at most 10, preferably at most 5, more preferably at most 4, and most preferably at most 3.5 wt. %, based on the weight of the other monomers used to form the eventual polymer. If cyclic carbonate monomers other than GCMA are used, or if the desired molecular weight is different, the amounts may need to be adjusted to account for such other monomers or different molecular weight.

In a preferred embodiment, the cyclic carbonate monomer, oligomer or polymer produced in step a) is reacted in step a), or in step b1) or step b2) with other monomers that do not contain cyclic carbonate groups, to form the eventual polymer. Exemplary such other monomers include hydroxy-functional unsaturated monomers, alkyl (meth)acrylates, vinyl monomers, and the like. Representative hydroxy-functional unsaturated monomers include hydroxyethyl acrylate (HEA), hydroxyethyl methacrylate (HEMA), hydroxypropyl (meth)acrylate (HPMA), and other monomers that will be familiar to persons having ordinary skill in the art. Preferred eventual polymers are prepared from at least 10, more preferably at least 15, and most preferably at least 30 wt. % hydroxy-functional monomer(s), based on the total weight of the monomers used. Preferred eventual polymers are also prepared from at most 60, more preferably at most 50, and most preferably at most 45 wt. % hydroxy-functional monomer(s), based on the total weight of the monomers used.

The disclosed alkyl (meth)acrylates typically are esters of acrylic or methacrylic acid. Representative alkyl (meth)acrylates include those having the structure: $CH_2=C(R^{11})-CO-OR^{12}$ wherein $R^{11}$ is hydrogen or methyl, and $R^{12}$ is an alkyl group preferably containing 1 to 16 carbon atoms. In some embodiments, $R^{12}$ is hydrogen. The $R^{12}$ group can be substituted with 1 or more, and typically 1 to 3, moieties such as hydroxy, halo, phenyl, and alkoxy, for example. Suitable alkyl (meth)acrylates therefore encompass hydroxyalkyl (meth)acrylates and many hydroxyl-functional unsaturated monomers. Preferably, $R^{11}$ is hydrogen or methyl and $R^{12}$ is an alkyl group having 2 to 8 carbon atoms. Most preferably, $R^{11}$ is hydrogen or methyl and $R^{12}$ is an alkyl group having 2 to 4 carbon atoms. Examples of suitable alkyl (meth)acrylates include, but are not limited to, methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, benzyl (meth)acrylate, lauryl (meth)acrylate, isobornyl (meth)acrylate, octyl (meth)acrylate, nonyl (meth)acrylate, and mixtures thereof.

Representative vinyl monomers include those represented by the structure:

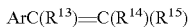

$$ArC(R^{13})=C(R^{14})(R^{15})$$

where $R^{13}$, $R^{14}$, and $R^{15}$ are hydrogen or an alkyl group of 1 to 5 carbon atoms and Ar is a substituted or unsubstituted aromatic group. Illustrative vinyl aromatic monomers include styrene, methyl styrene, halostyrene, isoprene, diallylphthalate, divinylbenzene, conjugated butadiene, alpha-methylstyrene, vinyl toluene, vinyl naphthalene, acrylonitrile, acrylamide, methacrylamide, methacrylonitrile, vinyl acetate, vinyl propionate, vinyl butyrate, vinyl stearate, isobutoxymethyl acrylamide, and mixtures thereof. Styrene is a presently preferred vinyl monomer, in part due to its relatively low cost. Vinyl aromatic monomers may for example represent about 0 to 80 wt. % of the monomers employed to make the eventual polymer. Preferred eventual polymers are prepared from at least 5, at least 30 or at least 40 wt. %, and from up to 70 or up to 60 wt. % vinyl monomer(s), based on the total weight of the monomers.

The aforementioned monomers may be polymerized by standard free radical polymerization techniques, e.g., using initiators such as azoalkanes, peroxides or peroxy esters, and using initiator amounts and reaction conditions that will be familiar to persons having ordinary skill in the art. This reaction may be carried out using suitable solvents, if desired.

For packaging coatings, the eventual polymer preferably is a polyether polymer, polyether-acrylate copolymer, or an emulsion-polymerized latex polymer, and preferably is substantially free of segments derived from bisphenol A and epoxides thereof. In some embodiments, the eventual polymer is also substantially free of segments derived from any or all of bisphenol F, bisphenol S and epoxides thereof. In some embodiments, the polymer is substantially free of segments derived from bisphenol monomers and epoxides thereof. In some embodiments, the polyether polymer is essentially free of polyhydric phenols having estrogenic activity greater than or equal to that of bisphenol S, and epoxides thereof. Methods for making polyether polymers, polyether-acrylate copolymers or emulsion-polymerized latex polymers for packaging coatings are described, for example, in U.S. Pat. No. 4,413,015 (Anderson et al), U.S. Pat. No. 4,446,258 (Chu), U.S. Pat. No. 4,963,602 (Patel), U.S. Pat. No. 5,296,525 (Spencer), U.S. Pat. No. 5,527,840 (Chutko et al.), (Pedersen et al.), U.S. Pat. No. 7,189,787 B2 (O'Brien et al. '787), U.S. Pat. No. 7,592,047 B2 (O'Brien et al. '047), U.S. Pat. No. 8,092,876 B2 (O'Brien et al. '876), U.S. Pat. No. 8,835,012 B2 (O'Brien et al. '012), U.S. Pat. No. 9,029,470 B2 (Rademacher et al.), U.S. Pat. No. 9,181,448 B2 (Li et al.), U.S. Pat. No. 9,409,219 B2 (Niederst et al.) and U.S. Pat. No. 9,670,378 B2 (Moussa et al.), and in U.S. Patent Application Publication Nos. US 2013/0280455 A1 (Evans et al.), US 2017/0096408 A1 (Gibanel et al. '408), US 2017/0096579 A1 (Gibanel et al. '579) and US 2017/051177 A1 (Prouvost et al.). Using the teachings of the present disclosure, persons having ordinary skill in the art will readily be able to adapt these polymers and copolymers to provide a wide variety of water-dispersible or water-dispersed polymers (including copolymers).

The disclosed water-dispersible or water-dispersed polymers (or reaction products obtained from such polymers) may be applied to a variety of substrates as liquid coating compositions or as "solid" coating compositions (e.g., powder-based, extrusion or laminate coating compositions). Liquid coating compositions (typically including the polymer and a liquid carrier) may be preferred for many end uses, especially for use on heat-sensitive substrates or for substrates where an especially thin coating is desired. Exemplary liquid carriers include water, organic solvents, and mixtures of liquid carriers. Exemplary organic solvents include glycol ethers, alcohols, aromatic or aliphatic hydrocarbons, dibasic esters, ketones, esters, and the like. Preferably, such carriers are selected to provide a dispersion or solution of the polymer with which additional additives may be combined to provide a final coating formulation. In one embodiment, the disclosed liquid coating compositions are solvent-based systems that include no more than a de minimus amount of water (e.g., less than 2 wt. % of water). The disclosed solvent-based liquid coating compositions may for example contain at least 20 wt. % non-volatile components (viz., "solids"), and more preferably at least 25 wt. % non-volatile components. The disclosed solvent-based liquid coating compositions may also for example contain no greater than 50 wt. % non-volatile components, and more preferably no greater than 40 wt. % non-volatile components. For such an organic solvent-based composition, the non-volatile film-forming components preferably include at least 50 wt. % of the disclosed polymer, more preferably at least 55 wt. % of the polymer, and even more preferably at least 60 wt. % of the polymer. For such an organic solvent-based composition, the non-volatile film-forming components preferably include no greater than 95 wt. % of the disclosed polymer, and more preferably no greater than 85 wt. % of the polymer.

Water-based systems may be made for example as described in U.S. Pat. No. 3,943,187 (Wu), U.S. Pat. No. 4,076,676 (Sommerfeld), U.S. Pat. No. 4,212,781 (Evans et al), U.S. Pat. No. 4,247,439 (Matthews et al.), U.S. Pat. No. 4,285,847 (Ting), U.S. Pat. No. 4,413,015 (Anderson et al), U.S. Pat. No. 4,446,258 (Chu), U.S. Pat. No. 4,517,322 (Birkmeyer et al), U.S. Pat. No. 4,963,602 (Patel), U.S. Pat. No. 5,296,525 (Spencer), U.S. Pat. No. 5,527,840 (Chutko et al.), U.S. Pat. No. 5,922,817 (Pedersen et al.), U.S. Pat. No. 7,189,787 B2 (O'Brien et al. '787) and U.S. Pat. No. 8,092,876 B2 (O'Brien et al. '876) and in U.S. Patent Application Publication No. US 2005/0196629 A1 (Bariatinsky et al.). Water-based coating systems may optionally include one or more organic solvents, which will typically be selected to be miscible in water. The liquid carrier system of a water-based coating composition will typically include at least 50 wt. % water, more typically at least 75 wt. % water, and in some embodiments more than 90 wt. % or more than 95 wt. % water. The presumed quaternary ammonium salt groups (and if desired, additional salt groups) may be used to disperse the disclosed polymers in water.

The disclosed water-based compositions may for example contain at least 15 wt. % non-volatile components. The disclosed water-based compositions may also for example contain no greater than 50 wt. % non-volatile components, and more preferably no greater than 40 wt. % non-volatile components. For such a water-based composition, the non-volatile film-forming components preferably include at least 5 wt. % of the disclosed polymer, more preferably at least 25 wt. % of the polymer, even more preferably at least 30 wt. % of the polymer, and optimally at least 40 wt. % of the polymer. For such a water-based composition, the non-volatile film forming components preferably include no greater than 70 wt. % of the disclosed polymer, and more preferably no greater than 60 wt. % of the polymer.

The disclosed polymers may serve as a binder polymer in the disclosed coating compositions. The binder polymer amount may vary widely depending on a variety of considerations including the method of application, the presence of other film-forming materials, whether the coating composition is a water-based or solvent-based system, and so on. For liquid-based coating compositions, the binder polymer will typically constitute at least 10 wt. %, more typically at least 30 wt. %, and even more typically at least 50 wt. % of the coating composition, based on the total weight of resin solids in the coating composition. For such liquid-based coating compositions, the binder polymer will typically constitute less than about 90 wt. %, more typically less than about 85 wt. %, and even more typically less than about 70 wt. % of the coating composition, based on the total weight of resin solids in the coating composition.

Preferred coating compositions are substantially free of any of (and more preferably, substantially free of the combined total of all of) BPA, bisphenol S (BPS) and bisphenol F (BPF). Preferred coating compositions are also substantially free of any of (and more preferably, substantially free of the combined total of all of) the diglycidyl ether and diglycidyl ester derivatives of these compounds, viz., of bisphenol A diglycidyl ether (BADGE), bisphenol A diglycidyl ester, BPS diglycidyl ether, BPS diglycidyl ester, BPF diglycidyl ether and BPF diglycidyl ester. The disclosed coating compositions are more preferably essentially free of any of (and yet more preferably, essentially free of the combined total of all of) these compounds and their derivatives, and most preferably completely free of any of (and yet more preferably, completely free of the combined total of all of) these compounds and their derivatives, no matter how they may have been incorporated into the coating compositions or the polymers and other ingredients contained therein.

As discussed above, in some embodiments the polymer, and more preferably the coating composition, does not include any structural units derived from a bisphenol monomer. By avoiding the inclusion of bisphenol monomers in the materials used to make preferred polymers of the present invention, there is no potential for any residual unreacted bisphenol monomer to be present in the coating composition or to migrate from a coating formed from such composition.

Bisphenol monomers typically have a molecular weight of less than 500 Daltons, more typically less than 400 Daltons, and yet more typically less than 350 Daltons. Examples of bisphenol monomers include bisphenol A, bisphenol AP, bisphenol AF, bisphenol B, bisphenol BP, bisphenol C, bisphenol E, bisphenol F, bisphenol G, bisphenol I, bisphenol M, bisphenol P, bisphenol PH, bisphenol S, bisphenol TMC, bisphenol Z, 4,4'-(propane-2,2-diyl)bis(2,6-dibromophenol), 2,2-bis(4-hydroxyphenyl)propanoic acid, and the like. Bisphenol monomers are typically synthesized via reaction of a phenol compound with a ketone (e.g., formaldehyde, acetalaldehyde, acetone, cyclohexanone, acetophenone, and the like). For example, bisphenol A may be synthesized via reaction of two equivalents of phenol with one equivalent of acetone.

In some embodiments, the coating composition includes an acrylic component that may optionally be covalently attached to the disclosed polymer, for example through addition polymerization, graft polymerization, ester interchange or a condensation reaction. In some embodiments, the acrylic component may be present as a separate polymer blended with the polymer (in addition to any acrylic component that may optionally be covalently attached to the polymer). In certain water-based embodiments in which at least some of the acrylic component is covalently attached to the polymer, at least a portion of the acrylic monomers used to form the acrylic component may help disperse the polymer in water. In such embodiments, the acrylic component is preferably formed from an ethylenically unsaturated monomer mixture that includes one or more α,β-unsaturated carboxylic acids.

The coating composition may include any amount of acrylic component suitable to produce the desired film or coating properties. In some acrylic-component-containing embodiments, the coating composition includes an amount of acrylic component of at least about 5 wt. %, more preferably at least about 10 wt. %, and even more preferably at least about 15 wt. %, as determined based on the weight of the monomer mixture used to prepare the acrylic component compared to the total weight of resin solids in the coating system. In such embodiments, the coating composition preferably includes less than about 95 wt. %, more preferably less than about 75 wt. %, and even more preferably less than about 30 to 40 wt. % acrylic component.

When the disclosed coating compositions include polymers having suitable reactive groups (for example, excess unreacted cyclic carbonate groups, epoxy groups, phenoxy groups or ethylenically unsaturated groups), the coating composition preferably also is formulated using one or more optional curing agents (for example, crosslinking resins, sometimes referred to as "crosslinkers"). The choice of a particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellow or non-yellowing crosslinkers, or only a small amount of a yellow or yellowing crosslinker. Compositions containing excess unreacted cyclic carbonate groups and compositions containing epoxy groups may be crosslinked using primary or secondary polyamines (e.g., primary diamines). Compositions containing phenoxy groups may be crosslinked with hydroxyl-reactive curing resins such as phenoplasts, aminoplast, nitrogen-containing carboxyl-reactive ("NCCR") crosslinkers, blocked or unblocked isocyanates, or mixtures thereof.

Exemplary phenoplast resins include the condensation products of aldehydes with phenols. Formaldehyde and acetaldehyde are preferred aldehydes. Various phenols can be employed including phenol, cresol, p-phenylphenol, p-tert-butylphenol, p-tert-amylphenol and cyclopentylphenol.

Exemplary aminoplast resins are the condensation products of aldehydes such as formaldehyde, acetaldehyde, crotonaldehyde, and benzaldehyde with amino- or amido- group-containing substances such as urea, melamine, and benzoguanamine. Examples of suitable aminoplast crosslinking resins include, without limitation, benzoguanamine-formaldehyde resins, melamine-formaldehyde resins, etherified melamine-formaldehyde, and urea-formaldehyde resins.

Exemplary NCCR crosslinkers include the beta-hydroxyalkylamide compounds discussed in International Application Publication No. WO 2018/085052 A1, and include the PRIMID™ XL-552 and PRIMID QM-1260 products commercially available from EMS.

Exemplary other generally suitable curing agents include blocked or non-blocked aliphatic, cycloaliphatic or aromatic di-, tri-, or poly-valent isocyanates, such as hexamethylene diisocyanate, cyclohexyl-1,4-diisocyanate, and the like. Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates having an Mn of at least about 300, more preferably at least about 650, and even more preferably at least about 1,000 may be used. Polymeric blocked isocyanates are useful in certain embodiments.

The level of curing agent (viz., crosslinker) used will typically depend on the type of curing agent, the time and temperature of the bake, and the molecular weight of the binder polymer. If used, the crosslinker is typically present in an amount of up to 50 wt. %, preferably up to 30 wt. %, and more preferably up to 15 wt. % based on the total weight of the resin solids in the coating composition. If used, a crosslinker is preferably present in an amount of at least 0.1 wt. %, more preferably at least 1 wt. %, and even more preferably at least 1.5 wt. % based upon the total resin solids weight.

The disclosed coating compositions may also include other optional polymers that do not adversely affect the coating composition or a cured coating thereof. Such optional polymers are typically included as a nonreactive filler material, although they may be included as a reactive crosslinker, or to provide other desired properties. Such optional nonreactive filler polymers include, for example, acrylics as discussed above, polyesters, polyamides, polyethers, and novalacs. Alternatively, such additional polymeric materials or monomers may be reactive with other components of the composition (e.g., an acid-functional or unsaturated polymer). If desired, reactive polymers may be incorporated into the disclosed compositions, for example to provide additional functionality for various purposes, including crosslinking or to assist in dispersing the disclosed water-dispersible or water-dispersed polymers into water. Examples of such reactive polymers include, for example, functionalized acrylics, polyesters, polyamides and polyethers.

Another preferred optional ingredient is a catalyst to increase the rate of cure. Examples of catalysts, include, but are not limited to, strong acids including phosphoric acid, dodecylbenzene sulfonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid; quaternary ammonium compounds; phosphorous compounds; and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons having ordinary skill in the art. If used, a catalyst is preferably present in an amount of at least 0.01 wt. %, and more preferably at least 0.1 wt. %, based on the weight of nonvolatile material in the coating composition. If used, a catalyst is preferably present in an amount of no greater than 3 wt. %, and more preferably no greater than 1 wt. %, based on the weight of nonvolatile material in the coating composition.

Another useful optional ingredient is a lubricant (e.g., a wax), which facilitates manufacture of fabricated metal articles (e.g., container closures and food or beverage can ends) by imparting lubricity to sheets of coated metal substrate. Non-limiting examples of suitable lubricants include, for example, natural waxes such as Carnauba wax or lanolin wax, polytetrafluoroethane (PTFE) and polyethylene-type lubricants. If used, a lubricant is preferably present in the coating composition in an amount of at least 0.1 wt. %, and preferably no greater than 2 wt. %, and more preferably no greater than 1 wt. %, based on the total weight of nonvolatile material in the coating composition.

Another useful optional ingredient is a pigment, such as titanium dioxide. If used, a pigment is present in the disclosed coating composition in an amount of no greater than 70 wt. %, more preferably no greater than 50 wt. %, and even more preferably no greater than 40 wt. %, based on the total weight of solids in the coating composition.

Surfactants may optionally be added to the disclosed coating composition to aid in flow and wetting of a substrate. Examples of surfactants include, but are not limited to, nonylphenol polyethers and salts and similar surfactants known to persons having ordinary skill in the art. If used, a surfactant is preferably present in an amount of at least wt. %, and more preferably at least 0.1 wt. %, based on the weight of resin solids. If used, a surfactant is preferably present in an amount no greater than 10 wt. %, and more preferably no greater than 5 wt. %, based on the weight of resin solids.

The disclosed coating compositions may also include other optional ingredients that do not adversely affect the coating composition or cured coating thereof. Such optional ingredients are typically included in a coating composition to enhance composition esthetics; to facilitate manufacturing, processing, handling, or application of the composition; or to further improve a particular functional property of a coating composition or a cured coating thereof. For example, the disclosed coating compositions may optionally include fillers other than those already mentioned, dyes, colorants, toners, coalescents, extenders, anticorrosion agents, flow control agents, thixotropic agents, dispersing agents, antioxidants, oxygen-scavenging materials, adhesion promoters, light stabilizers, and mixtures thereof, as required to provide desired film properties. Each optional ingredient is preferably included in a sufficient amount to serve its intended purpose, but not in such an amount to adversely affect a coating composition or a cured coating thereof.

The disclosed water-dispersible or water-dispersed polymers and coating compositions preferably are substantially free, essentially free, essentially completely free or completely free of unreacted monomers, halogen atoms, sulfur atoms (e.g., sulfides), chromates or other materials that might impart an off-taste to food or beverages, absorb (viz., "scalp") flavor components of foods or beverages, cause migration of dangerous or potentially dangerous additives into a food or beverage, or otherwise render the disclosed coating compositions unsuitable for use in packaging foods and beverages.

The disclosed coating compositions may be present as a layer of a mono-layer coating system or as one or more layers of a multi-layer coating system. The coating composition can be used as a primer coat, an intermediate coat, a top coat, or a combination thereof. The coating thickness of a particular layer and of the overall coating system will vary depending upon the coating material used, the substrate, the coating application method, and the end use for the coated article. Mono-layer or multi-layer coating systems including one or more layers formed from the disclosed coating composition may have any suitable overall coating thickness, but will typically have an overall average dry coating thickness of from about 1 to about 60 micrometers and more typically from about 2 to about 15 micrometers. Typically, the average total coating thickness for rigid metal food or beverage can applications will be about 3 to about 10 micrometers. Coating systems for use on closures (e.g., twist-off metal closures) for food or beverage containers may have an average total coating thickness up to about 15 micrometers. In certain embodiments in which the coating composition is used as an interior coating on a drum (e.g., a drum for use with food or beverage products), the total coating thickness may be approximately 25 micrometers. Using the mixed units commonly employed in the packaging industry, mono-layer or multi-layer coating systems including one or more layers formed from the disclosed coating composition may for example be applied at coating weights of about 0.155 to 3.1 mg/cm$^2$ (about 1 to about 20 mg/in$^2$ or "msi") and more typically at about 0.23 to 1.55 mg/cm$^2$ (about 1.5 to about 10 msi). Typically, the coating weight for rigid metal food or beverage can applications will be about 0.155 to 0.93 mg/cm$^2$ (about 1 to about 6 msi). In certain embodiments in which the coating composition is used as an interior coating on a drum (e.g., a drum for use with food or beverage products), the coating weight may be approximately 20 msi, which corresponds to about 3.1 mg/cm$^2$.

The metal substrate used in forming rigid food or beverage cans, or portions thereof, typically has a thickness in the range of about 125 micrometers to about 635 micrometers. Electro tinplated steel, cold-rolled steel and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The disclosed coating compositions may be applied to a substrate either prior to, or after, the substrate is formed into an article such as, for example, a food or beverage container or a portion thereof. In one embodiment, a method of forming food or beverage cans is provided that includes: applying a coating composition described herein to a metal substrate (e.g., applying the composition to the metal substrate in the form of a planar coil or sheet), hardening the composition, and forming (e.g., via stamping) the substrate into a packaging container or a portion thereof (e.g., a food or beverage can or a portion thereof). For example, two-piece or three-piece cans or portions thereof such as riveted beverage can ends (e.g., soda or beer cans) with a cured coating of the disclosed coating composition on a surface thereof can be formed in such a method. In another embodiment, a method of forming food or beverage cans is provided that includes: forming (e.g., via stamping) a metal substrate into a packaging container or a portion thereof (e.g., a food or beverage can or a portion thereof), applying a coating composition described herein to the inside, outside or both inside and outside portions of such packaging container or a portion thereof, and hardening the composition. The disclosed coating compositions are especially desirable for use on the inside or interior portion of such food or beverage containers, and for other applications involving prolonged food or beverage contact with a metal substrate. Exemplary such applications include two-piece drawn food cans, three-piece food cans, food can ends, drawn and ironed food or beverage cans, beverage can ends, easy open can ends, twist-off closure lids, and the like.

The disclosed coating compositions may be applied to the disclosed substrates using a variety of different coating techniques (e.g., spray coating, roll coating, wash coating, dipping, etc.). In preferred embodiments, the coating composition is applied as an inside spray coating.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating compositions may be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If a metal coil is the substrate to be coated, curing of the applied coating composition may be conducted, for example, by heating the coated metal substrate over a suitable time period to a peak metal temperature ("PMT") of preferably greater than about 177° C. More preferably, the coated metal coil is heated for a suitable time period (e.g., about 5 to 900 seconds) to a PMT of at least about 218° C.

The following examples are offered to aid in understanding of the present invention and are not to be construed as limiting the scope thereof. Unless otherwise indicated, all parts and percentages are by weight. Compositions such as those described in the Examples may be evaluated using a variety of tests including:

Differential Scanning Calorimetry

Samples for differential scanning calorimetry ("DSC") testing are prepared by first applying a liquid resin composition containing the polymer of interest onto aluminum sheet panels. The panels are baked in a Fisher ISOTEMP™ electric oven for 20 minutes at 149° C. to remove volatile materials. After cooling to room temperature, the samples are scraped from the panels, weighed into standard sample pans and analyzed using a standard DSC heat-cool-heat method in which the samples are equilibrated at −60° C., then heated at 20° C. per minute to 200° C., cooled to −60° C., and then heated again at 20° C. per minute to 200° C. Tg values are calculated from a thermogram of the last heat cycle, with Tg being measured at the inflection point of the transition.

Solvent Resistance

The extent of "cure" or crosslinking of a coating may be measured as a resistance to solvents, such as methyl ethyl ketone (MEK) or isopropyl alcohol (IPA). This test is performed as described in ASTM D5402-93. The number of double-rubs (i.e., one back-and forth motion) is reported.

Global Extraction

The global extraction test is designed to estimate the total amount of extractable material that can potentially migrate out of a coating and into food packed in a coated can. Typically a coated substrate is subjected to water or solvent blends under a variety of conditions to simulate a given end use.

Extraction may for example be evaluated using the procedures described in European Union Commission Directives 82/711/EEC, 93/8/EEC and 97/48/EC, and using 3% acetic acid (weight/volume) as a simulant for aqueous and acidic foodstuffs, and 10, 50 and 95 volume percent ethanol solutions as respective simulants for alcoholic foodstuffs, milky foodstuffs and fatty foodstuffs. Coated panels are cut into 2×12.5 cm strips. The strips are folded in half and placed in a 125 mL glass jar. At least two samples are evaluated for each test. The jars are filled with 100 mL of food simulant solution, covered with polytetrafluoroethylene film in sealed with plastic caps. The jars and a similar weighed control jar containing food simulant solution but no coated panel strip are placed in an oven or autoclave for the time periods specified in the Directive, then removed and cooled. The simulant solutions are transferred to clean, weighed 125 mL glass jars and the solutions are evaporated to dryness. The measured residue for the control solution is subtracted from the measured residue for the test sample and the migration in milligrams per $dm^2$ of coating is calculated.

Extraction may also be evaluated using the procedure described in 21 CFR section 175.300, paragraph (e) (4) (xv) but with modifications according to the FDA publication "Guidelines for Industry" for preparation of Food Contact Notifications, to ensure worst-case scenario performance: 1) the alcohol content is increased to 10% by weight and 2) the filled containers are held for a 10-day equilibrium period at 37.8° C. The coated beverage can is filled with 10 wt. % aqueous ethanol and subjected to pasteurization conditions (65.6° C.) for 2 hours, followed by a 10-day equilibrium period at 37.8° C. Determination of the amount of extractives is determined as described in 21 CFR section 175.300, paragraph (e) (5), and ppm values are calculated based on surface area of the can (no end) of 283.9 $cm^2$ with a volume of 355 milliliters (ml). Preferred coatings give global extraction results of less than 50 ppm, more preferred results of less than 10 ppm, and even more preferred results of less than 1 ppm. Most preferably, the global extraction results are optimally non-detectable.

Adhesion

Adhesion testing may be performed to assess whether the coating adheres to the coated substrate. The adhesion test is performed according to ASTM D3359, Test Method B, using SCOTCH™ 610 tape (available from the 3M Company of Saint Paul, Minnesota). Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above.

Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. Testing is accomplished by subjecting the coated substrate to heat ranging from 105° C. to 130° C. and pressure ranging from 0.7 kg/cm² to 1.05 kg/cm² for a period of 15 minutes to 90 minutes. For the present evaluation, the coated substrate may be partially immersed in deionized water and subjected to heat of 121° C. and pressure of 1.05 kg/cm² for a period of 60 minutes. The water-immersed and vapor-exposed portions of the coated substrate may then be tested for adhesion and blush as described above. In food or beverage applications requiring retort performance, water/vapor adhesion ratings of 10/10 and blush ratings of at least 7/7 are typically desired for commercially viable coatings.

Crazing—Reverse Impact Resistance

Reverse impact resistance measures the ability of a coated substrate to withstand the deformation encountered when impacted by a steel punch with a hemispherical head. For the present evaluation, a coated substrate may be subjected to force using a BYK-GARDNER™ "overall" Bend and Impact Tester (available from Byk-Gardner, Inc.) and rated visually for micro-cracking or micro-fracturing—commonly referred to as crazing. Test pieces are impacted on the uncoated or reverse side. A rating of 10 indicates no craze and suggests sufficient flexibility and cure. A rating of 0 indicates complete failure. Commercially viable coatings preferably show slight or no crazing on a reverse impact test.

206 End Fabrication

This test is a measure of fabrication ability of a coating. Standard size 206 can ends are formed in a press from coated steel plate. The ends are evaluated for initial failure. The ends are then soaked for 10 minutes in a copper sulfate solution containing 69 parts deionized water, 20 parts anhydrous copper sulfate, 10 parts concentrated hydrochloric acid and 1 part DOWFAX™ 2A1 surfactant (available from Dow Chemical Company). The percentage of the end circumference that is uncorroded is recorded.

Food Simulant Tests

The resistance properties of stamped standard size 202 ends formed from coated plate were evaluated by processing (retorting) them in three food simulants for 60 minutes at 121° C. and 1.05 kg/cm². The three food simulants were deionized water, a 1% by weight solution of lactic acid in deionized water and a solution of 2% sodium chloride and 3% acetic acid by weight in deionized water. An additional simulant, 2% sodium chloride in deionized water, is processed for 90 minutes at 121° C. and 1.05 kg/cm². Adhesion tests are performed as described above. Blush and corrosion are rated visually.

Preparatory Example 1

Acid-Functional Acrylic Prepolymer A

A premix of 2245.54 parts glacial methacrylic acid, 1496.93 parts styrene, 1247.41 parts ethyl acrylate (EA), 2345.70 parts n-butanol, 167.58 parts deionized water, and 299.34 parts t-butyl peroctoate was prepared in a premix vessel. To a 5-liter reaction vessel equipped with a stirrer, reflux condenser, thermocouple, heating and cooling capability, and inert gas blanket, 1778.65 parts n-butanol and 85.25 parts deionized water were added. With agitation and an inert gas blanket on, the reaction vessel was heated to 97° C. Upon reaching that temperature, 46.44 parts t-butyl peroctoate was added. Five minutes after the t-butyl peroctoate addition, the premix was added at a constant rate to the reaction vessel over two and a half hours while maintaining the temperature at a range of 97° C. to 102° C. After the premix addition was complete, the premix vessel was rinsed with 118.63 parts n-butanol and the rinse was added into the reaction vessel. Immediately after rinsing, a second premix of 59.33 parts t-butyl peroctoate and 24.00 parts n-butanol was added to the reaction vessel over 60 minutes while maintaining the above temperature range. At the end of the addition, the premix vessel was rinsed into the reaction vessel with 22.00 parts n-butanol. Thirty minutes after rinsing the second premix vessel, 12.89 parts t-butyl peroctoate and 1.00 parts n-butanol were added to the reaction vessel. The reaction was allowed to proceed for an additional 2 hours at temperature. Following the hold, 47.32 parts deionized water was added and the reaction vessel cooled to less than 60° C. This process produced an acid-functional acrylic prepolymer with solids of ~50.0% NV, an acid number of ~290 and a Brookfield viscosity of ~25,000 centipoise at 80° F.

Preparatory Example 2

Acid-Functional GCMA—Containing Acrylic Prepolymer B

A premix of 449.09 parts glacial methacrylic acid, 249.49 parts styrene, 49.90 parts glycerol carbonate methacrylate (GCMA), 249.49 parts EA, 302.69 parts n-butanol, 33.52 parts deionized water, and 59.87 parts t-butyl peroctoate was prepared in a premix vessel. To a 5-liter reaction vessel equipped with a stirrer, reflux condenser, thermocouple, heating and cooling capability, and inert gas blanket, 355.73 parts n-butanol and 17.45 parts deionized water were added. With agitation and an inert gas blanket on, the reaction vessel was heated to 97° C. Upon reaching that temperature, 9.29 parts t-butyl peroctoate was added. Five minutes after the t-butyl peroctoate addition, the premix was added at a constant rate to the reaction vessel over two and a half hours while maintaining the temperature at a range of 97° C. to 102° C. After the premix addition was complete, the premix vessel was rinsed with 190.15 parts n-butanol going into the reaction vessel. Immediately after rinsing, a second premix of 11.87 parts t-butyl peroctoate and 4.80 parts n-butanol was added to the reaction vessel over 60 minutes while maintaining the above temperature range. At the end of the addition, the premix vessel was rinsed into the reaction vessel with 4.40 parts n-butanol. Thirty minutes after rinsing the second premix vessel, 2.58 parts t-butyl peroctoate and 0.20 parts n-butanol was added to the reaction vessel. The reaction was allowed to proceed for an additional 2 hours at temperature. Following the hold, 9.46 parts deionized water was added and the reaction vessel cooled to less than 60° C. This process produced an acid-functional, cyclic carbonate group-containing acrylic pre-polymer with solids of ~50.1% NV, an acid number of ~290 and a Brookfield viscosity of ~41,400 centipoise at 80° F.

Example 1

Water-Dispersible or Water-Dispersed Polymer Made with Prepolymer A, GCMA and DMEA To a 5-liter reaction vessel equipped with a stirrer, reflux condenser, thermocouple, heating and cooling capability, and inert gas blanket, 571.71 parts Prepolymer A and 1664.11 parts deionized water was added. With the agitation activated, the inert gas blanket on and the system set to total reflux, 50.34 parts dimethylethanol amine (DMEA) was added. Once addition was complete, the heat was set to 70° C. When temperature was reached, the mixture was held for 30 minutes to ensure homogeneous dispersion. In the meantime a monomer premix of 314.52 parts styrene, 441.22 parts butyl acrylate (BA), 61.29 parts GCMA was prepared. At the end of the 30 minute hold, 8.06 parts benzoin and 12.95 parts deionized water were added to the reaction vessel and the temperature was set to 82° C. At temperature, 8.06 parts 35% hydrogen peroxide solution and 12.94 parts deionized water were added to the reaction vessel. The monomer premix was added exactly 5 minutes after hydrogen peroxide addition at a constant rate over 30 minutes. Following the monomer premix addition, 289.10 parts deionized water was added and the reaction was allowed to proceed for 10 minutes. Following this brief hold, 1.40 parts benzoin, 1.37 part 35% hydrogen peroxide solution, and 9.80 parts deionized water were added to the reaction vessel. The reaction was allowed to proceed for 45 minutes. At the end of the hold, 0.46 parts benzoin, 0.46 part 35% hydrogen peroxide solution, and 9.80 parts deionized water were added. The reaction was allowed to stir for 2 additional hours at temperature. The heat was disengaged at the end of the hold and 4.41 parts TRIGONOX™ A-W70, 0.61 parts iron complex solution, 3.04 parts erythorbic acid, 3.27 parts DMEA, and 31.06 parts deionized water were added to the vessel. The reaction was allowed to exotherm and cool to room temperature. This process produced a quaternary ammonium salt group-containing acrylic emulsion with solids of 30.8% NV, an acid number of 82.2, particle size of 0.41 μm, and #4 Ford Cup viscosity of 15 seconds.

Example 2

Water-Dispersible or Water-Dispersed Polymer Made with Prepolymer A, GCMA and DMEA To a 3-liter reaction vessel equipped with a stirrer, reflux condenser, thermocouple, heating and cooling capability, and inert gas blanket, 359.36 parts Prepolymer A and 104.6 parts deionized water was added. With the agitation activated, the inert gas blanket on and system set to total reflux, 31.64 parts DMEA was added. Once addition was complete, the heat was set to 70° C. When temperature was reached, 12.60 parts GCMA was added to the reaction vessel and the temperature was set to 100° C. The temperature was held at 100° C. for 2 hours. In the meantime a monomer premix of 210.67 parts styrene and 290.30 parts BA was prepared. The reaction was cooled to 70° C. when the hold was completed and 941.49 parts deionized water, which aided in the cooling, was added. The reaction was held for 30 minutes at 70° C. At the end of the 30 minute hold, 5.07 parts benzoin and 8.15 parts deionized water were added to the reaction vessel and the temperature was set to 82° C. At temperature, 5.07 parts 35% hydrogen peroxide solution and 8.15 parts deionized water were added to the reaction vessel. The monomer premix was added 5 minutes after the hydrogen peroxide addition at a constant rate over 30 minutes. Following the monomer premix addition, 181.72 parts deionized water was added and the reaction was allowed to proceed for 10 minutes. Following this brief hold, 0.88 parts benzoin, 0.86 parts 35% hydrogen peroxide solution and 6.16 parts deionized water were added to the reaction vessel. The reaction was allowed to proceed for 45 minutes. At the end of this hold, 0.29 parts benzoin, 0.29 part 35% hydrogen peroxide solution, and 6.16 parts deionized water were added. The reaction was allowed to stir for 2 additional hours at temperature. The heat was disengaged at the end of the hold and 2.77 parts Trigonox A-W70, 0.38 parts iron complex solution, 1.91 parts erythorbic acid, 2.06 parts DMEA and 19.52 parts deionized water were added to the vessel. The reaction was allowed to exotherm and cool to room temperature. This process produced a quaternary ammonium salt group-containing acrylic emulsion with solids of 31.3% NV, an acid number of 74.7, particle size of 0.49 μm, and #4 Ford Cup viscosity of 17 seconds.

Example 3

Water-Dispersible or Water-Dispersed Polymer Made with Prepolymer B, GCMA and DMEA To a 5-liter reaction vessel equipped with a stirrer, reflux condenser, thermocouple, heating and cooling capability, and inert gas blanket, 571.71 parts Prepolymer B and 1664.11 parts deionized water can be added. With the agitation activated, the inert gas blanket on and the system set to total reflux, 50.34 parts DMEA can be added. Once the addition is complete, the heat can be set to 70° C. When this temperature is reached, the mixture can be held for 30 minutes to ensure homogeneous dispersion. In the meantime a monomer premix of 314.52 parts styrene, 441.22 parts BA and 61.29 parts GCMA can be prepared. At the end of the 30 minute hold, 8.06 parts benzoin and 12.95 parts deionized water can be added to the reaction vessel and the temperature can be set to 82° C. At that temperature, 8.06 parts 35% hydrogen peroxide solution and 12.94 parts deionized water can be added to the reaction vessel. The monomer premix can be added 5 minutes after the hydrogen peroxide addition at a constant rate over 30 minutes. Following the monomer premix addition, 289.10 parts deionized water can be added and the reaction can be allowed to proceed for 10 minutes. Following this brief hold, 1.40 parts benzoin, 1.37 part 35% hydrogen peroxide solution, and 9.80 parts deionized water can be added to the reaction vessel. The reaction can be allowed to proceed for 45 minutes. At the end of this hold, 0.46 parts benzoin, 0.46 part 35% hydrogen peroxide solution and 9.80 parts deionized water can be added. The reaction can be allowed to stir for 2 additional hours at temperature. The heat can be disengaged at the end of the hold and 4.41 parts Trigonox A-W70, 0.61 parts iron complex solution, 3.04 parts erythorbic acid, 3.27 parts DMEA and 31.06 parts deionized water can be added to the vessel. The reaction can be allowed to exotherm and cool to room temperature. This process can produce a quaternary ammonium salt group-containing acrylic emulsion with solids of ~30.0% NV, and an acid number of ~80.

Example 4

Quaternary Ammonium Salt Group-Containing Polymer

To a 5-liter round bottom flask equipped with a thermocouple, a reflux condenser, nitrogen blanket and a prop mixer, 138.6 parts n-butanol and 104.6 parts 2-butoxyethanol can be added. The agitation can be engaged, set to total reflux, and the nitrogen blanket activated. The heat set point can be 96° C. At a reactor temperature of 94° C., 7.81 parts of tert-butyl peroxy-2-ethylhexanoate and 1.53 parts 2-butoxyethanol can be added and held for 5 minutes. At the end of the 5 minute hold a dual-simultaneous feed can be charged into the vessel over 105 minutes using as premix feed 1 a mixture of 266.3 parts styrene, 177.5 parts DCPA, 124.3 parts HPMA, 31.03 parts GCMA, and 35.1 parts 2-butoxyethanol, and using as premix feed 2 a mixture of 24.8 parts of tert-butyl peroxy-2-ethylhexanoate and 20.2 parts 2-butoxyethanol. At the end of the feed time, premix feed 1 can be flushed using 31.9 parts 2-butoxyethanol while an additional premix containing a mixture of 24.8 parts of tert-butyl peroxy-2-ethylhexanoate and 20.2 parts 2-butoxyethanol is fed over 60 minutes. Once the latter premix feed is complete, a flush of 38.2 parts 2-butoxyethanol can be charged into the vessel and the temperature can be held for 60 minutes. A chase of 2.4 parts of tert-butyl peroxy-2-ethylhexanoate and 1.5 parts 2-butoxyethanol can be added and held for 60 minutes. A second chase of 2.4 parts of tert-butyl peroxy-2-ethylhexanoate and 1.5 parts 2-butoxyethanol can be added and held for 60 minutes. A third and final chase of 2.4 parts of tert-butyl peroxy-2-ethylhexanoate and 1.5 parts 2-butoxyethanol can be added and held for 60 minutes. The reaction can be cooled to room temperature and shut down for the night. The next day the reactor temperature can be set to 103° C. and agitation reengaged with the addition of 452.85 parts of a preformed acid-functional acrylic made from 107 parts methacrylic acid, 53.5 parts styrene, 17.8 parts ethyl acrylate, 198.0 parts n-butanol, 18.2 parts DI Water, 50.2 parts 2-butoxyethanol, and 8.0 parts benzoyl peroxide (with the peroxide being consumed in the polymerization of the preformed acrylic). Along with the preformed acrylic, 20.7 parts n-hexylglycol and 18 parts DI Water can be added and the reflux and nitrogen blanket can be reengaged. To the reactor 64.9 parts dimethyl ethanolamine can be added over 5 minutes at a reactor temperature of 103° C. and held for 4-hours at temperature. At the end of the hold, 155.6 parts DI water can be added over 10 minutes followed by a 60 minute hold. Once the hold is complete, the agitation can be increased to 320 rpm and 1836.6 parts DI water can be added over 60 minutes. The set point can be set to room temperature and the system can be cooled at the end of the DI water addition. This process can produce a quaternary ammonium salt group-containing polymer containing about 22% non-volatile materials and having a particle size of about 0.5µm, a viscosity of about 112 cps at 27° C., and a pH of about 7.3.

Example 5

GCMA-Modified Conventional Latex

To a 5-liter reaction vessel equipped with a stirrer, reflux condenser, thermocouple, heating and cooling capability, and an inert gas blanket, 638.15 parts deionized water was added. In the meantime a pre-emulsion monomer premix of 268.16 parts styrene, 126.33 parts BA, 23.40 parts glacial methacrylic acid, 24.22 parts DMEA, 50.02 parts GCMA, 409.70 parts deionized water, 24.05 parts sodium dioctyl sulfosuccinate and 1.17 parts ammonium persulfate was prepared in an Erlenmeyer flask by mixing the contents until well dispersed. The heat was engaged on the 5-liter vessel, the temperature set to 80° C., and the inert gas blanket was activated. Once at temperature, the monomer premix was fed at a constant rate over 150 minutes while maintaining the reaction temperature. At the end of the feed, 659.02 parts deionized water was added and the reaction was allowed to proceed at temperature for 60 minutes. Once the hold was complete, 0.85 parts t-butyl peroctoate and 4.50 parts 2-butoxyethanol was added and the reaction was held for an additional 60 minutes. Following the second hold, the reaction was cooled to room temperature. This process produced an acrylic emulsion with solids of ~21.0% NV.

Example 6

Performance Testing

The Example 1 emulsion was formed into a food and beverage coating, applied to MEK-wiped CH14-H10 aluminum, and compared to a similar coating in which the emulsion was made using GMA rather than GCMA. The results are shown below in Table 1:

TABLE 1

| Coating | Waterborne Acrylic Latex made with GMA | Waterborne Acrylic Latex made with GCMA |
| --- | --- | --- |
| Film Weight (msi): | 2.0 | 2.2 |
| Film Tg (° C.): | 17 | 17 |
| Film Performance: | | |
| Wetting: | Good | Good |
| Adhesion: | 10 | 10 |
| Reverse Impact Crazing (1.6 N-m force): | 10 | 10 |
| MEK Resistance (Double Rubs): | 6 | <5 |
| Water Process Adhesion (Water/Vapor) | 10/10 | 10/10 |

The Example 1 emulsion exhibited generally comparable performance in the indicated performance parameters to that obtained using an acrylic made with GMA. The Example 1 emulsion also exhibited somewhat lower blush performance. However, it is believed that closer adjustment of the stoichiometric amounts of GMCA compared to the tertiary amine should resolve that issue.

Having thus described preferred embodiments of the present invention, those of skill in the art will readily appreciate that the teachings found herein may be applied to yet other embodiments within the scope of the claims hereto attached. The complete disclosure of all listed patents, patent documents and publications (including material safety data sheets, technical data sheets and product brochures for the raw materials and ingredients used in the Examples) are incorporated herein by reference as if individually incorporated.

The invention claimed is:

1. An aqueous coating composition including an emulsion polymerized latex prepared from ingredients comprising:
   a surfactant;
   ethylenically unsaturated monomers including an ethylenically unsaturated monomer containing one or more cyclic carbonate groups and an alkyl (meth) acrylate, wherein the cyclic carbonate groups are six-membered rings; and
   a tertiary amine;
   wherein the aqueous coating composition is an inside spray food or beverage container coating composition.

2. The coating composition of claim 1, wherein the ethylenically unsaturated monomers comprise an alkyl (meth) acrylate and glycerol carbonate methacrylate.

3. The coating composition of claim 1, wherein the tertiary amine comprises triethyl amine, dimethyl ethanol amine, or a mixture thereof.

4. The coating composition of claim 1, wherein the ethylenically unsaturated monomers are emulsion polymerized in the presence of an aqueous dispersion of the surfactant.

5. The coating composition of claim 4, wherein the surfactant comprises a polymeric surfactant.

6. The coating composition of claim 5, wherein the polymeric surfactant comprises an acrylic polymer.

7. The coating composition of claim 5, wherein the polymeric surfactant comprises an acid-or anhydride-functional polymer that has been brought into contact with the tertiary amine.

8. The coating composition of claim 7, wherein the acid- or anhydride-functional polymer comprises an acid-or anhydride-functional organic solution polymerized acrylic polymer.

9. The coating composition of claim 8, wherein the acid- or anhydride-functional organic solution polymerized acrylic polymer has an acid number greater than about 100 milligrams KOH per gram of polymer.

10. The coating composition of claim 8, wherein the acid- or anhydride-functional organic solution polymerized acrylic polymer has a number average molecular weight of at least 2,000 Daltons to at most 15,000 Daltons.

11. The coating composition of claim 7, wherein an excess of acid equivalents over amine groups is employed in preparing the latex.

12. An aqueous coating composition including an emulsion polymerized latex prepared from ingredients comprising:
an aqueous dispersion formed from ingredients including a tertiary amine and an acid- or anhydride-functional organic solution polymerized acrylic polymer; and
ethylenically unsaturated monomers including an alkyl (meth) acrylate and glycerol carbonate methacrylate, 4-vinyl-1,3-dioxolan-2-one, 4-[(ethenyloxy) methyl]-1,3-dioxolan-2-one, 4-(4-ethenylphenyl) methoxy) methyl)-1,3-dioxolan-2-one, glycerin carbonate vinyl ether, (2-oxo-1, 3-dioxolan-4-yl) methyl acrylate, or (5-ethyl-2-oxo-1,3-dioxan-5-yl) methyl 2-methylprop-2-enoate, or mixture thereof;
wherein the ethylenically unsaturated monomers are emulsion polymerized in the presence of the aqueous dispersion; and
wherein the aqueous coating composition includes at least 15 weight percent of non-volatile components, is substantially free of halogen atoms, is substantially free of bisphenol A, and is an inside spray food or beverage container coating composition.

13. The coating composition of claim 12, wherein the ethylenically unsaturated monomers comprise an alkyl (meth) acrylate and glycerol carbonate methacrylate.

14. The coating composition of claim 12, wherein the tertiary amine comprises triethyl amine, dimethyl ethanol amine, or a mixture thereof.

15. The coating composition of claim 12, wherein the acid- or anhydride-functional organic solution polymerized acrylic polymer has an acid number greater than about 100 milligrams KOH per gram of polymer.

16. The coating composition of claim 12, wherein the acid-or anhydride-functional organic solution polymerized acrylic polymer has a number average molecular weight of at least 2,000 Daltons to at most 15,000 Daltons.

17. The coating composition of claim 12, wherein the acid-or anhydride-functional organic solution polymerized acrylic polymer is formed from monomers including acrylic acid, methacrylic acid, or a mixture thereof.

18. The coating composition of claim 17, wherein the acrylic acid, methacrylic acid, or mixture thereof comprises at least 20% by weight of the monomers used to form the acid-or anhydride-functional organic solution polymerized acrylic polymer.

19. The coating composition of claim 12, wherein the emulsion polymerized latex includes quaternary ammonium salt groups.

* * * * *